United States Patent [19]

Tanaka

[11] Patent Number: 5,126,843
[45] Date of Patent: Jun. 30, 1992

[54] INTERPOLATION SIGNAL PRODUCING CIRCUIT WITH IMPROVED AMPLITUDE INTERPOLATION

[75] Inventor: Yutaka Tanaka, Kanagawa, Japan

[73] Assignee: Sony Corporation, Tokyo, Japan

[21] Appl. No.: 749,878

[22] Filed: Aug. 26, 1991

Related U.S. Application Data

[62] Division of Ser. No. 482,065, Feb. 20, 1990, abandoned.

[30] Foreign Application Priority Data

Mar. 10, 1989 [JP] Japan .................. 1-0585690

[51] Int. Cl.$^5$ .............................. H04N 7/01
[52] U.S. Cl. ................... 358/138; 358/160; 358/140
[58] Field of Search ............. 358/140, 138, 160, 11

[56] References Cited

U.S. PATENT DOCUMENTS 4,730,217  3/1988  Tonge et al. .................. 358/105 X
4,941,045  7/1990  Birch .................. 358/140
4,989,090  1/1991  Campbell .................. 358/140
5,046,164  9/1991  Hurst, Jr. .................. 358/140

FOREIGN PATENT DOCUMENTS

66903/86 12/1986 Australia .

Primary Examiner—Victor R. Kostak
Attorney, Agent, or Firm—Alvin Sinderbrand; William S. Frommer

[57] ABSTRACT

In an interpolation signal producing circuit, amplitudes of a plurality of proximate pixel signals are compared and the order of magnitudes of such pixel signals is determined, whereupon an interpolation signal is derived which is intermediate the largest and smallest amplitudes, for example, next to the largest or smallest amplitudes or an average thereof. The interpolation signal thus derived may be advantageously employed for sub-sampling, that is, doubling the number of pixels in each horizontal scanning line of a displayed video picture, for doubling the horizontal scanning lines in a field, or in compensating for drop-out and the like.

3 Claims, 12 Drawing Sheets (n−1)th Field (n)th Field (n+1)th Field (n-2)nd Field (n-1)th Field (n)th Field

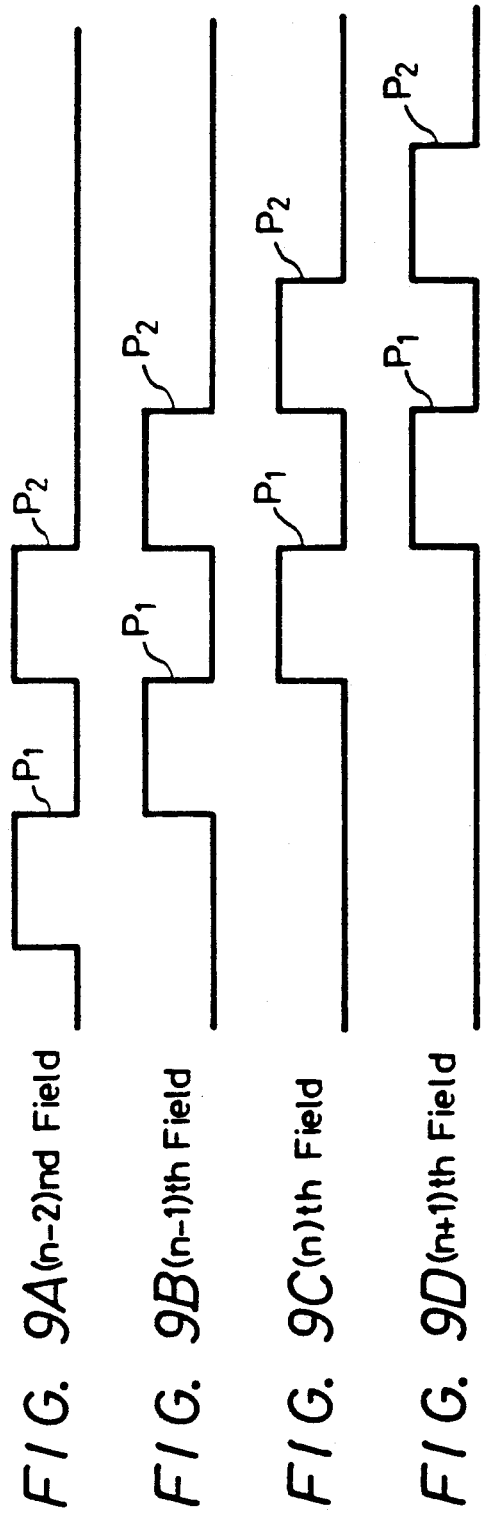
FIG. 9A (n-2)nd Field
FIG. 9B (n-1)th Field
FIG. 9C (n)th Field
FIG. 9D (n+1)th Field
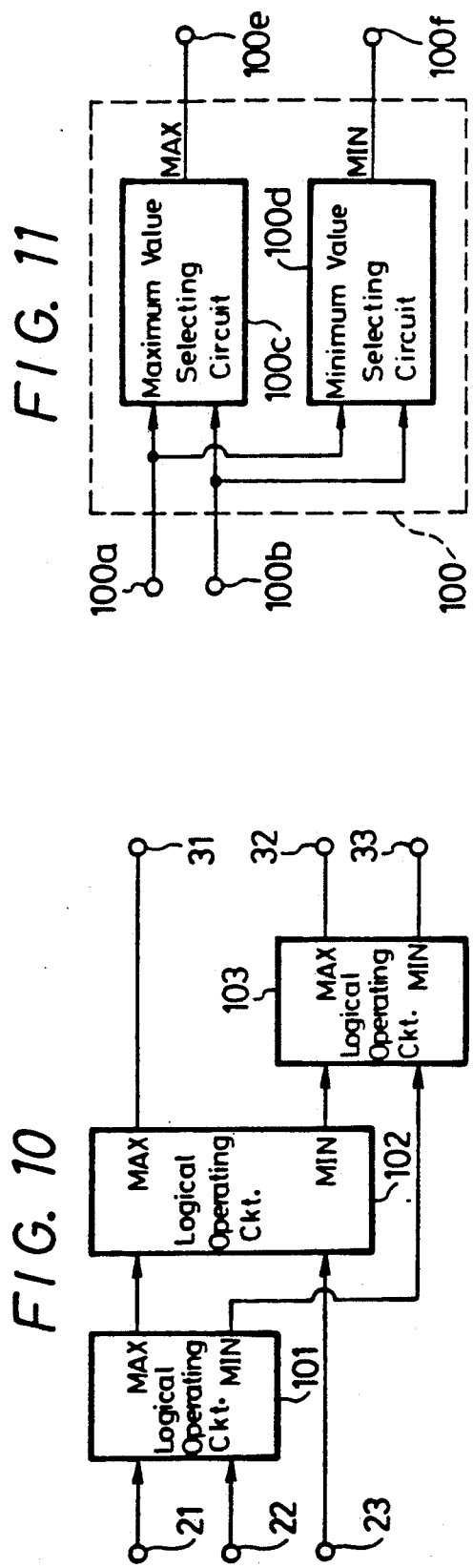
FIG. 11
FIG. 10

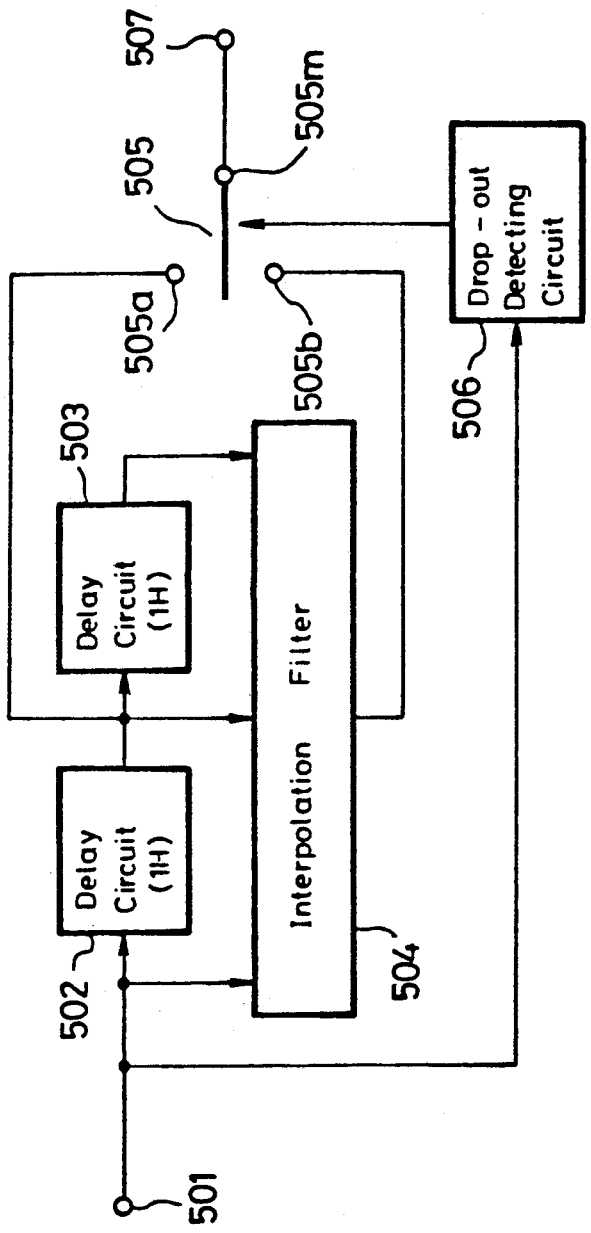
FIG. 20
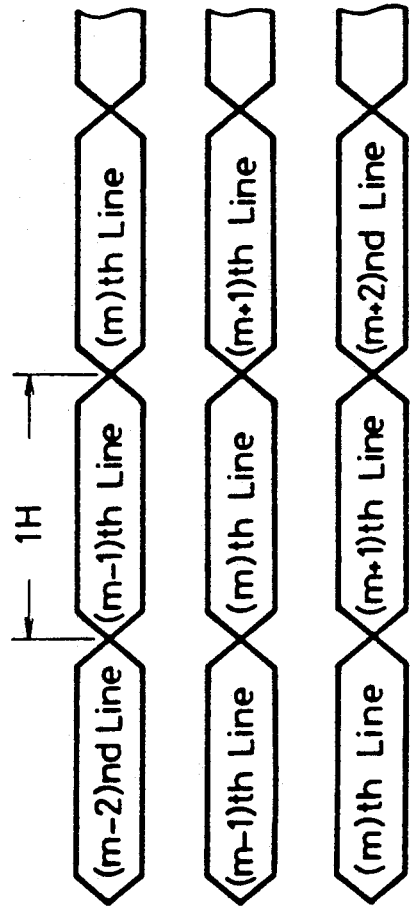
FIG. 21A
FIG. 21B
FIG. 21C

INTERPOLATION SIGNAL PRODUCING CIRCUIT WITH IMPROVED AMPLITUDE INTERPOLATION

This application is a division of application Ser. No. 07/482,065, filed Feb. 20, 1990 now abandoned.

BACKGROUND OF THE INVENTION

1. Field of the Invention

The present invention relates generally to an interpolation signal producing circuit, and more particularly is directed to a relatively simple interpolation signal producing circuit which can produce various kinds of interpolation signals, for example, for doubling scanning lines, or for compensating for dropped-out pixels and the like.

2. Description of the Prior Art

In a recently proposed television receiver, a reproduced picture of high definition is to be obtained by increasing the number of pixels (picture elements) in each field of a received video signal. According to this proposal, resolution in the vertical direction of the reproduced picture is improved by a so-called double-scanning system in which horizontal scanning lines in one field of the video signal are doubled and non-interlace scanning is carried out at each field. On the other hand, resolution in the horizontal direction of the reproduced picture is improved by a so-called sub-sampling system in which the number of pixels within one horizontal scanning line is doubled by inserting interpolation signals therebetween.

A case in which horizontal scanning lines are doubled in order to effect the double-scanning will now be explained with reference to FIGS. 1A-1C. An interpolated horizontal scanning line is shown by a dashed line in FIG. 1B to be provided between two adjacent horizontal lines of an (n)th field, and a predetermined pixel $x_1$ is formed on this interpolated horizontal scanning line either by an interfield interpolation method or by an intrafield interpolation method.

In the intrafield interpolation method, the amplitude of the interpolation pixel $x_1$ is determined from the amplitudes of adjacent pixels $a_1$ and $b_1$ of upper and lower horizontal scanning lines, as $x_1 = (a_1 + b_1)/2$.

In the interfield interpolation method, the amplitude of the interpolation pixel $x_1$ is determined from a pixel $c_1$ (FIG. 1A) located at the same position as the interpolation pixel $x_1$, but in an $(n-1)$th field, that is, one field before the (n)th field.

Advantages and disadvantages of the interfield interpolation method and the intrafield interpolation method will now be described and, in connection therewith, it will be assumed that a level "1" indicates white and a level "0" indicates black. Further, it will be assumed that a still picture to be reproduced is as shown in FIG. 2, and wherein a rectangular white image W appears against a black background B. In such case, an interpolation pixel $x_1$, formed on the boundary portion between the white image W and the black background B, is represented as $x_1 = (a_1 + b_1)/2 = (1+0)/2 = 0.5$ according to the intrafield interpolation method. On the other hand, the same interpolation pixel is represented as $x_1 = c_1 = 1$ (where pixel $c_1$ is located at the same position in the preceding field and is assumed to be white) according to the interfield interpolation method. Thus, the interfield interpolation method can correctly form the interpolation pixel, whereas the intrafield interpolation method provides a color level which is a mixture of white and black at the boundary portion and thereby results in an indistinct boundary between the white image and the black background.

Further, in the case of a real moving picture in which a rectangular white image W is moved relative to a black background B, as shown in FIG. 3 from a position shown by a dashed-line in an $(n-1)$th field to the position shown in full lines in the next or (n)th field, so that the white images W of the $(n-1)$th field and of the (n)th field do not overlap each other, then an interpolation signal $x_1'$ formed within the white image W is represented as $x_1' = (a_1' + b_1')/2 = 1$ according to the intrafield interpolation method. In the same case, the interpolation signal is represented as $x_1' = c_1' = 0$ ($c_1'$ is a pixel in the same position as the interpolation pixel $x_1'$ but in the preceding field) according to the interfield interpolation method. As a result, for the situation shown in FIG. 3, the intrafield interpolation method can correctly form the interpolation pixel $x_1'$ whereas the interfield interpolation method causes a black pixel to occur in the white image W, thus forming an erroneous interpolation signal.

In order to avoid the above-described defects inherent in the prior-art interpolation, a combination of the interfield interpolation method and the intrafield interpolation method has been proposed. In accordance with such proposal, motion in a picture is initially detected, and an interpolation pixel signal $x_1$ is formed with respect to a still picture portion by the interfield interpolation method, whereas an interpolation pixel signal $x_1$ is formed with respect to a moving picture portion by the intrafield interpolation method. A circuit employing the known combination of the interfield and intrafield interpolation methods is shown in FIG. 4, in which an input terminal 1 receives a signal at a point a on a predetermined horizontal scanning line, hereinafter referred to as the (m)th line, and an input terminal 2 receives a signal at a point $b_1$ on a predetermined horizontal scanning line hereinafter referred to as (m+1)th line. The signals $a_1$ and $b_1$ applied to the input terminals 1 and 2 are supplied to an adder 3 and the resultant signal is supplied to an attenuator 4 in which its signal level is attenuated by one-half. The attenuated signal is supplied to one end of the resistance element of a variable resistor 5. A signal at a point c on the (m)th line of the preceding or $(n-1)$th field is applied to an input terminal 6, and is fed therefrom to the other end of the resistance element of the variable resistor 5 whose slide contact is connected to an output terminal 7 from which an interpolation signal is derived.

The slide contact of the variable resistor 5 is changed in position under the control of a movement detection circuit 8. When movement in an input video signal is detected by the circuit 8, the slide contact of the variable resistor 5 is moved to one end of the resistance element, so that an interpolation signal provided by the intrafield interpolation method is supplied to the output terminal 7. When the input video signal is detected to be a still picture by the movement detection circuit 8, the slide contact of the variable resistor 5 is moved to the other end of the resistance element for thereby supplying to the terminal 7 an interpolation signal provided by the interfield interpolation method. In this fashion, the intrafield interpolation method and the interfield interpolation method are selectively used on the basis of whether or not movement in the input video signal is detected by the movement detection circuit 8.

It is also known to employ sub-sampling for doubling the number of pixels within each horizonal scanning line. For example, as shown in FIG. 5C, an interpolation pixel $x_2$ may be provided between pixels $b_2$ and $c_2$ on a certain horizontal scanning line of an (n)th field by either a intrafield interpolation method or an interframe interpolation method. In the case of the intrafield interpolation method, the interpolation pixel $x_2$ is formed from adjacent pixels $a_2$ and $d_2$ on the adjacent upper and lower horizontal scanning lines and the adjacent pixels $b_2$ and $c_2$ on the same horizontal scanning line so that $x_2 = (a_2 + b_2 + c_2 + d_2)/4$ is established. In the case of the interframe interpolation method, the interpolation pixel $x_2$ is formed from a pixel $e_2$ located at the same position as that of the interpolation pixel $x_2$, but in the (n−2)nd field (FIG. 5A) which is one frame before the (n)th field, and $x_2 = e_2$ is established.

The results of these two methods will be compared for the case of a still picture formed of a black background B with a rectangular white image W located within the background B, as shown in FIG. 6. An interpolation pixel $x_2$ formed at the boundary portion of the white image W by the intraframe interpolation method (assuming that only the pixel $d_2$ on the lower horizontal line is located within the black background B) is expressed as $x_2 = (a_2 + b_2 + c_2 + d_2)/4 = (1+1+1+0)/4 = 0.75$. On the other hand, interpolation pixel $x_2$, formed by the interframe interpolation method, is expressed as $x_2 = e_2 = 1$. Therefore, it will be seen that, in the case of a still picture, the interpolation pixel is correctly formed by the interframe interpolation method, whereas the intrafield interpolation method causes a color level corresponding to a mixture of white and black to occur at the boundary portion which is thereby made indistinct.

In the case of a real moving picture in which a rectangular white image W is moved within a black background B, as shown in FIG. 7, and assuming that the white portion W of the preceding frame, or (n−2)nd field, is located as shown by a broken line in FIG. 7 and does not overlap the range of the white image W of the present or (n)th field, if an interpolation pixel $x_2'$ is to be formed at a boundary portion of the white image W where only the adjacent pixel $c_2'$ on the right is located within the black background B and the other pixels $a_2'$, $b_2'$ and $d_2'$ are located within the white image W, then, in accordance with the intrafield interpolation method, the interpolation pixel $x_2'$ is expressed as $x_2' = (a_2' + b_2' + c_2' + d_2')/4 = (1+1+0+1)/4 = 0.75$. On the other hand, in accordance with the interframe interpolation method, the interpolation pixel $x_2'$ is expressed as $x_2' = e_2' = 0$ (pixel $e_2'$ corresponds to the interpolation pixel $x_2'$ of the preceding frame). Therefore, it is apparent that the correct interpolation pixel is formed by the intrafield interpolation method, whereas, the interframe interpolation method provides a black pixel within the white image W, that is, an erroneous interpolation signal is formed.

In order to avoid the above-described defects inherent in the prior art, it has been proposed that, interpolation is carried out, motion of the picture be detected, and interpolation signal $x_2$ be formed by the interframe interpolation method for a still picture portion, whereas, interpolation signal $x_2'$ is formed by the intrafield interpolations method for the real moving picture portion.

More specifically, in a circuit shown in FIG. 8 for combining the intrafield and interframe interpolation methods, a signal at a point $b_2$ on a predetermined horizontal scanning line, which is hereinafter referred to as (m)th line in an (n)th field, is applied to an input terminal 11, and a signal at a point $c_2$ also on the (m)th line of the (n)th field is supplied to an input terminal 12. A signal at a point $a_2$ on an (m−1)th line is supplied to an input terminal 13, and a signal at a point $d_2$ on an (m+1)th line is supplied to an input terminal 14. These signals applied to the input terminals 11, 12, 13 and 14 are supplied to an adder 15, and the resultant added signal is supplied to an attenuator 16, in which its signal level is attenuated by one-fourth. This attenuated or average signal is supplied to one end of the resistance element of a variable resistor 17. Further, a signal at the point $e_2$ of the (m)th line of the (n−2)nd field, that is, one frame before the (n)th field, is applied to an input terminal 18, and is supplied therefrom to the other end of the resistance element of the variable resistor 17. A slide contact of the variable resistor 17 is connected to an output terminal 19 from which an interpolation signal may be derived. The slide contact of the variable resistor 17 is changed in position under the control of a movement detection circuit 20. Thus, when a movement is detected in an input video signal by the circuit 20, the slide contact of the variable resistor 17 is moved to one end of the resistance element for supplying to the output terminal 19 an interpolation signal produced by the intrafield interpolation method. Conversely, when the detecting circuit 20 indicates that the input video signal is a still picture, circuit 20 causes the slide contact of the variable resistor 17 to be moved to the other end of the resistance element for supplying an interpolation signal produced by the interframe interpolation method to the output terminal 19. In this fashion, the intrafield interpolation method and the interframe interpolation method are selectively used on the basis of whether or not motion in the picture is detected by the circuit 20.

It is apparent from the above that satisfactory interpolation cannot be achieved in either double-scanning or sub-sampling without detecting the motion of a picture and, in practice, it is very difficult to carry out perfect movement detection for the reasons described more fully below with reference to FIGS. 9A to 9D.

FIGS. 9A to 9D illustrate the assumed positions of two pulse signals $P_1$ and $P_2$ representing white portions on a predetermined horizontal line, and which are sequentially moved at the successive fields (n−2), (n−1), (n), and (n+1). When the pixel position of the pulse signal $P_1$ of the (n)th field (FIG. 9C) coincides with the pixel position of the pulse signal $P_2$ of the (n−2)nd field, that is, one frame before (FIG. 9A), if the movement detection is carried out on the basis of the pixel position of the pulse signal $P_1$ of the (n)th field, then the pixel is detected as a still picture portion having no motion. In other words, in the illustrated states of FIGS. 9A and 9C, or of FIGS. 9B and 9D, the pulse signal $P_1$ and the pulse signal $P_2$ are at the same horizontal positions along the respective line so that the difference between the frames at this pixel position cannot be detected from the signal level or the like. As a result, an interpolation signal for a still picture may be produced as an interpolation signal for a real moving picture, so that an erroneous interpolation signal is produced and the image quality is thereby deteriorated. This is the reason for the frequent observation that interpolation-processing, intended to improve the image quality, causes instead a decrease in the vertical and/or horizontal resolution.

Further, the above-described movement detection circuit is complicated and expensive, and cannot be readily utilized with a television receiver.

Furthermore, when a drop-out occurs in a reproduced image signal, or when the level of a reproduced image signal is lowered in a video apparatus, such as, a video tape reproducing apparatus or the like, the signal portion in which the drop-out occurs is replaced with a signal, for example, from the preceding horizontal line, under the control of a drop-out detecting circuit, for preventing noise from occurring in the reproduced picture.

However, it is not always optimal to replace a drop-out signal with a signal from the preceding horizontal line. For example, in the case of a still picture, it may be better to replace the drop-out signal with a signal from an adjacent horizontal line of the preceding field. Such processing requires the use of a movement detection circuit similar to that used for the double-scanning and sub-sampling, and the movement detection circuit makes the circuit arrangement complicated, as described above. Thus, in the prior art, the movement detection is usually not carried out, and a signal of the preceding horizontal line is usually utilized as an interpolation signal.

OBJECTS AND SUMMARY OF THE INVENTION

Therefore, it is an object of the present invention to provide an improved interpolation signal producing circuit which can eliminate the above-mentioned defects encountered with the prior art.

More specifically, it is an object of the present invention to provide a improved interpolation signal producing circuit which can provide a satisfactory interpolation signal by means of a simplified circuit arrangement.

It is another object of the present invention to provide an interpolation signal producing circuit, as aforesaid, which can produce a satisfactory interpolation signal for doubling the number of scanning lines or for doubling the number of pixels within one scanning line without the use of a motion detecting circuit.

It is still another object of the present invention to provide an interpolation signal producing circuit which can increase the resolution of a visual image.

It is a further object of the present invention to provide an interpolation signal producing circuit which ca produce a satisfactory interpolation signal to compensate for drop-out.

In accordance with an aspect of the present invention, an interpolation signal producing circuit comprises means, such as, a series circuit of time delays, receiving video signals and providing at least three proximate pixel signals thereof at respective outputs; means for comparing amplitudes of the proximate pixel signals and determining an order of magnitudes thereof; and means for generating an interpolation signal having an amplitude which is intermediate the largest and smallest of said amplitudes. The amplitude which is intermediate the largest and smallest amplitudes of the compared pixel signals may be the next to the largest amplitude or the next to the smallest amplitude or an average thereof.

In accordance with another aspect of the invention, an apparatus for doubling the number of horizontal lines in a displayed video picture comprises means receiving incoming video signals and providing at least a first pixel signal, a second pixel signal proximate to the first pixel signal and being in the same field and a third pixel signal which is also proximate the first and second pixels and is another field adjacent the field of the first and second pixels; means for comparing amplitudes of the first, second and third pixel signals and determining an order of magnitudes thereof; means for generating an interpolation signal having an amplitude which is intermediate the largest and smallest amplitudes in the order of magnitudes; means for timebase-compressing the first pixel signal and the interpolation signal; and means for alternately outputting the timebase-compressed first pixel signal and interpolation signal.

In accordance with still another aspect of the invention, an apparatus for doubling the number of horizontal lines in a displayed video picture comprises means receiving incoming video signals and providing first, second, third and fourth proximate pixel signals, with the first and second pixel signals being from the same field and the third and fourth pixel signals being from respective fields which are in preceding and succeeding relation to the field of the first and second pixel signals; means comparing amplitudes of the first, second, third and fourth pixel signals and determining an order of magnitudes thereof; means for generating an interpolation signal having an amplitude which, in the order of magnitudes, is a predetermined number from, for example, next to the largest or smallest of such amplitudes; means for timebase-compressing the first pixel signal and the interpolation signal; and means for alternately outputting the timebase-compressed first pixel signal and interpolation signal.

In accordance with still another aspect of this invention, an apparatus for sub-sampling a video signal so as to double the number of pixels within each horizontal scanning line of a displayed picture, comprises means receiving a video signal and providing first, second, third and fourth proximate pixel signals from the same field, the first and second pixel signals being situated adjacent each other on the same horizontal scanning line and the third and fourth pixel signals being situated on horizontal scanning lines above and below, respectively, the horizontal scanning line of the first and second pixel signals and being located between the first and second pixel signals in the direction along the respective horizontal scanning lines; means comparing amplitudes of the first, second, third and fourth pixel signals and determining an order of magnitudes thereof; means for generating an interpolation signal having an amplitude which is the average of the next to the largest and next to the smallest of the amplitudes of the compared signals; means for timebase-compressing the first pixel signal and the interpolation signal; and means for alternately outputting the timebase-compressed first pixel signal and interpolation signal as a sub-sampled video signal to be displayed.

In accordance with yet another aspect of this invention, a compensating circuit for dropouts in a video signal comprises means receiving a video signal and providing at least three proximate pixel signals; means comparing the amplitudes of the proximate pixel signals and providing an interpolation signal having an amplitude intermediate the maximum and minimum values of the compared amplitudes; dropout detecting means for detecting each dropout in the video signal; and means responsive to the dropout detecting means for replacing each detected output with the interpolation signal then being provided.

The above, and other objects, features and advantages of the present invention, will be apparent in the following detailed description of preferred embodiments of the invention when read in conjunction with the accompanying drawings.

BRIEF DESCRIPTION OF THE DRAWINGS

FIGS. 9A to 9D are waveform diagrams showing the level changes of pulse signals in successive fields, and to which reference will be made in explaining operation of a motion detecting circuit;

FIGS. 10, 11, 12 and 13 are schematic block diagrams of respective interpolation filters used in interpolation signal producing circuits in accordance with the present invention;

FIG. 20 is a block diagram showing an interpolation signal producing circuit according to a fourth embodiment of the present invention for compensating drop-outs in a video signal;

FIGS. 21A to 21C are timing charts to which reference will be made in explaining operation of the interpolation signal producing circuit shown in FIG. 20

DETAILED DESCRIPTION OF PREFERRED EMBODIMENTS

Figure 1A:
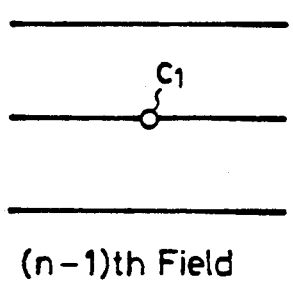
FIGS. 1A to 1C are schematic diagrams to which reference is made in explaining various types of interpolation signals for use in double-scanning.

The present invention will now be described in detail with reference to the drawings and, in order to understand the present invention more clearly, an interpolation filter that may be used in an interpolation signal producing circuit according to the present invention will first be explained with reference to FIG. 10. Such interpolation filter is adapted to compare amplitudes of input signals in a logical fashion and produces an interpolation signal on the basis of a predetermined compared result. A similar logic filter has been previously proposed as a logic interpolation filter which separates a signal having a correlation by a logical operation, for example, as disclosed in U.S. Pat. No. 4,524,382 having a common assignee herewith.

When an interpolation signal is to be produced for a video signal, for example, from three input signals, the logic filter is constructed as shown in FIG. 10. More particularly, input signals applied to input terminals 21 and 22 are supplied to a first logical operating circuit 101 which discriminates the amplitudes of the respective signals. The first logical operating circuit 101, and subsequent logical operating circuits 102 and 103 in FIG. 10, may each be formed of a circuit 100 as shown in FIG. 11.

In the logical operating circuit 100, a signal applied to one input terminal 100a and a signal applied to another input terminal 100b are supplied to a maximum value selecting circuit 100c and a minimum value selecting circuit 100d. The input signal having a larger amplitude, as selected by the maximum value selecting circuit 100c, is supplied to an output terminal 100e, and the input signal having a smaller amplitude, as selected by the minimum value selecting circuit 100d, is supplied to an output terminal 100f. Thus, of the signals applied to the two input terminals 100a and 100b, the signal having the larger amplitude (MAX signal) is developed at the output terminal 100e, whereas the signal having the smaller amplitude (MIN signal) is developed at the output terminal 100f, thereby discriminating between the amplitudes of the input signals. The output terminal 100e is hereinafter referred to as a maximum value output terminal, and the output terminal 100f is hereinafter referred to as a minimum value output terminal.

Referring again to FIG. 10, it will be seen that, in the circuit arrangement of the logic circuit there shown, an output signal derived from a maximum value output terminal of the first logical operating circuit 101 and an input signal applied to an input terminal 23 are both supplied to the second logical operating circuit 102. An output signal from a maximum value output terminal of the second logical operating circuit 102 is supplied to a first output terminal 31. An output signal from a minimum value output terminal of the first logical operating circuit 101 and an output signal from a minimum value output terminal of the second logical operating circuit 102 are supplied to a third logical operating circuit 103. An output signal from a maximum value output terminal of the third logical operating circuit 103 is supplied to a second output terminal 32, and an output signal from the minimum value output terminal of circuit 103 is supplied to a third output terminal 33.

Consequently, the input signals applied to the three input terminals 21, 22 and 23 are sorted according to their amplitudes and are delivered through the first, second and third output terminals 31, 32 and 33 in the sequential order of their decreasing amplitudes. Then, an interpolation signal is obtained from an output signal developed at a predetermined one or more of the output terminals 31–33 as will be hereinafter described.

Figure 12:
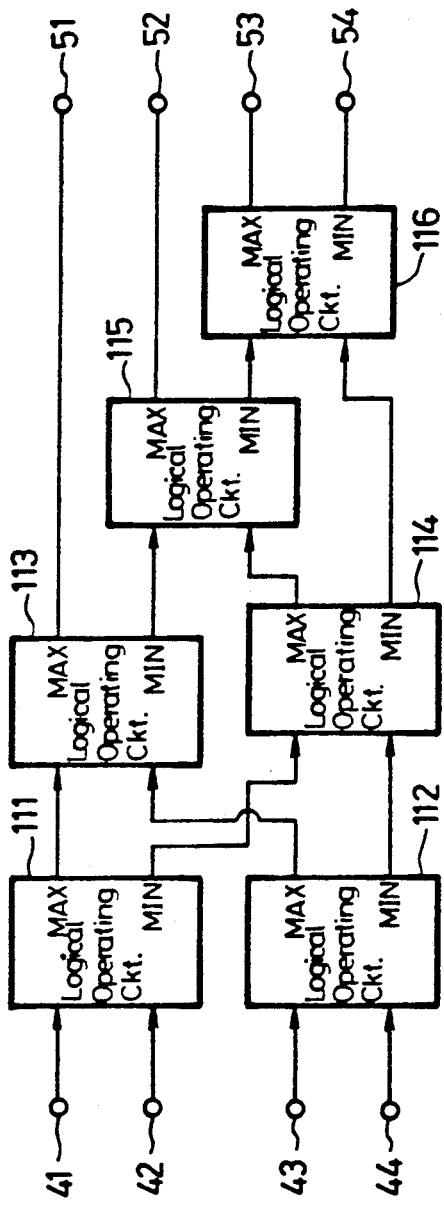

A logic filter with which an interpolation signal may be obtained from four input signals is shown in FIG. 12 to be generally comprised of four logical operating circuits 111–114 which may each be similar to the circuit of FIG. 11, and, in which input signals applied to input terminals 41 and 42 are supplied to the first logical operating circuit 111, whereas input signals applied to input terminals 43 and 44 are supplied to the second logical operating circuit 112. Output signals from the maximum output terminals of the first and second logical operating circuit 111 and 112 ar supplied to the third logical operating circuit 113. Output signals from minimum value output terminals of the first and second logical operating circuits 111 and 112 are supplied to the fourth logical operating circuit 114. An output signal at the maximum value output terminal of the third logical operating circuit 113 is supplied to a first output terminal 51, and an output signal at the minimum value output terminal of the third logical operating circuit 113 and an output signal at the maximum value output terminal of the fourth logical operating circuit 114 are supplied to the fifth logical operating circuit 115. An output signal at the maximum value output terminal of the fifth logical operating circuit 115 is supplied to a second output terminal 52, and output signals at the minimum value output terminals of the fourth and fifth logical operating circuits 114 and 115 are supplied to a sixth logical operating circuit 116. An output signal at the maximum value output terminal of the sixth logical operating circuit 116 is supplied to a third output terminal 53, and an output signal at the minimum value output terminal of the sixth logical operating circuit 116 is supplied to a fourth output terminal 54.

Consequently, the input signals applied to the four input terminals 41, 42, 43 and 44 are sorted according to their amplitudes and are delivered through first, second, third and fourth output terminals 51, 52, 53 and 54 in the sequential order of their decreasing amplitudes. Then, as hereinafter described, an interpolation signal is obtained from an output signal at a predetermined one or more of the output terminals 51–54.

Figure 13:
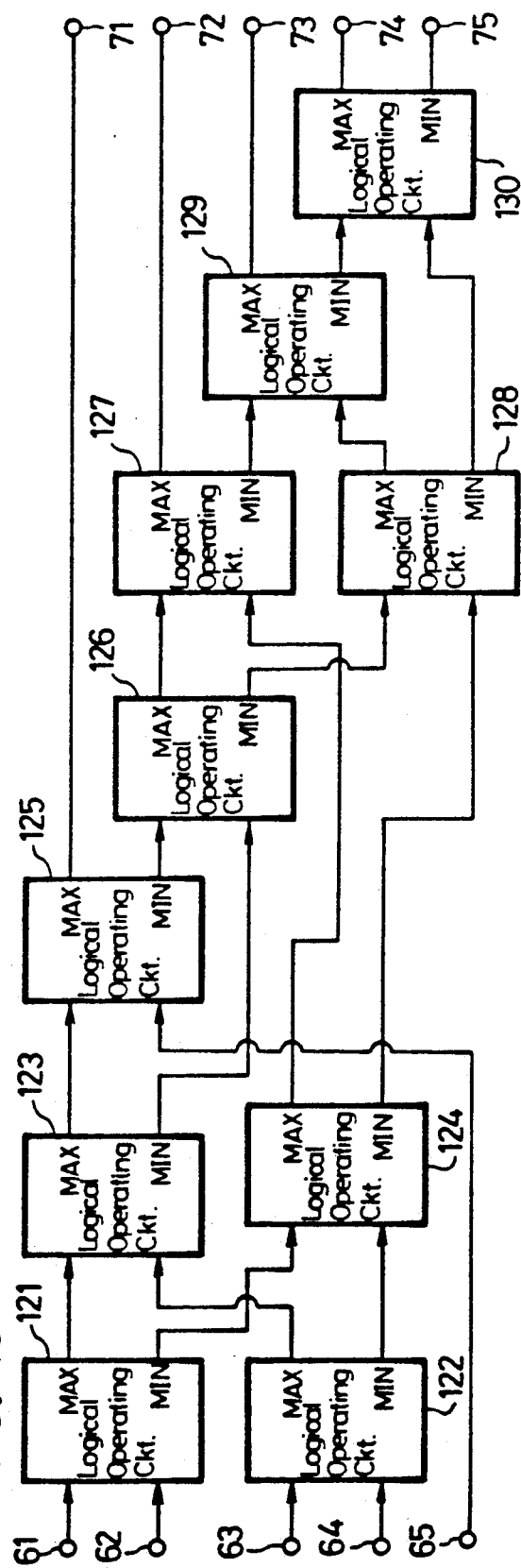

A logic filter with which an interpolation signal may be obtained from five input signals is shown in FIG. 13 to be generally comprised of ten logical operating circuits 121–130 which again may be each similar to the circuit of FIG. 11, and, in which input signals applied to input terminals 61 and 62 are supplied to the first logical operating circuit 121, whereas input signals applied to input terminals 63 and 64 are supplied to the second logical operating circuit 122. Output signals at maximum value output terminals of the first and second logical operating circuit 121 and 122 are supplied to the third logical operating circuit 123, and output signals at minimum value output terminals of the first and second logical operating circuits 121 and 122 are supplied to the fourth logical operating circuit 124. An output signal at the maximum value output terminal of the third logical operating circuit 123 and a fifth input signal applied to an input terminal 65 are supplied to the fifth logical operating circuit 125. An output signal from a maximum value output terminal of the fifth logical operating circuit 125 is supplied to a first output terminal 71. Output signals at minimum value output terminals of the third and fifth logical operating circuits 123 and 125 are supplied to the sixth logical operating circuit 126.

Further, output signals from maximum value output terminals of the fourth and sixth logical operating circuits 124 and 126 are supplied to the seventh logical operating circuit 127, whereas output signals from minimum value output terminals of the fourth and sixth logical operating circuits 124 and 126 are supplied to the eighth logical operating circuit 128. An output signal at a maximum value output terminal of the seventh logical operating circuit 127 is supplied to a second output terminal 72. An output signal from a minimum value output terminal of the seventh logical operating circuit 127 and an output signal from a maximum value output terminal of the eighth logical operating circuit 128 are supplied to the ninth logical operating circuit 129. An output signal at a maximum value output terminal of the ninth logical operating circuit 129 is supplied to a third output terminal 73, and output signals at minimum value output terminals of the eight and ninth logical operating circuits 128 and 129 are supplied to the tenth logical operating circuit 130. An output signal at a maximum value output terminal of the tenth logical operating circuit 130 is supplied to a fourth output terminal 74, and an output signal at a minimum value output terminal of the tenth logical operating circuit 130 is supplied to a fifth output terminal 75.

In operation of the logic filter circuit shown on FIG. 13, input signals applied to the five input terminals 61, 62, 63, 64 and 65, respectively, are delivered to the first, second, third, fourth and fifth output terminals 71, 72, 73, 74 and 75 in the sequential order of their decreasing amplitudes. Then, as hereinafter described, an interpolation signal is obtained from an output signal at a predetermined one or more of the output terminals 71–75.

Although FIGS. 10, 12 and 13 show logic interpolation filters for use with three, four and five input signals, respectively, in the case of six or more input signals, an interpolation filter for discriminating the amplitudes thereof may be formed by similarly connecting suitable pluralities of maximum and minimum value selecting circuits.

Figure 14:
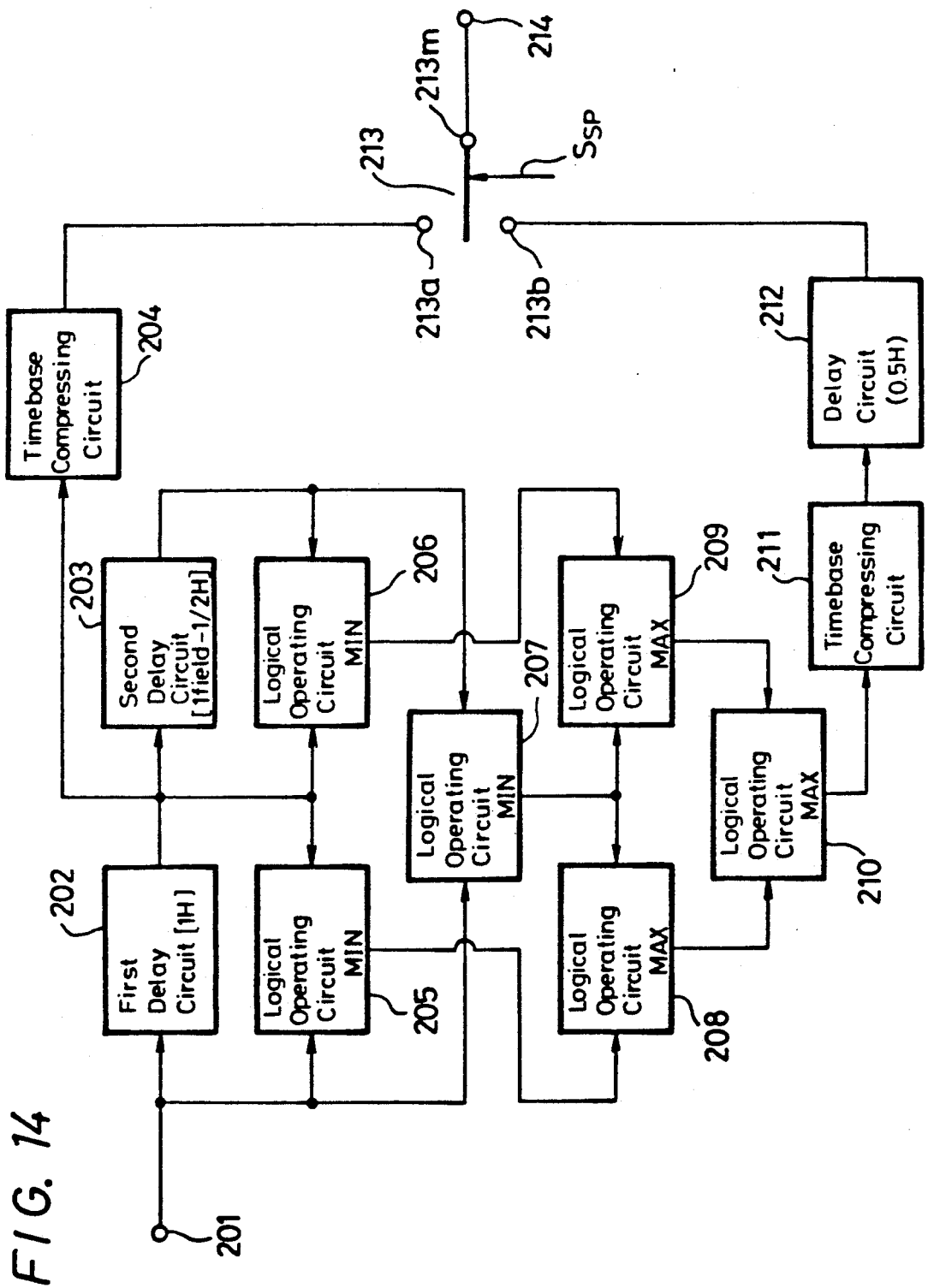
FIG. 14 is a block diagram showing an interpolation signal producing circuit according to a first embodiment of the present invention for doubling horizontal scanning lines of a displayed video picture.

Referring now to FIG. 14, it will be seen that an interpolation signal producing circuit according to a first embodiment of the present invention is there shown for carrying out a non-interlace scanning by doubling horizontal scanning lines of a video signal. More particularly, in FIG. 14, a video signal to be line-frequency-doubled is applied to an input terminal 201 and supplied therefrom to a first delay circuit 202 and then to a second delay circuit 203 in succession. In this embodiment, the first delay circuit 202 is adapted to delay the video signal by a delay time of one horizontal scanning period (1 H), whereas the second delay circuit 203 is adapted to further delay the video signal by a delay time of [1 field − ½ horizontal scanning period].

The output video signal from the first delay circuit 202 is also supplied through a timebase compressing circuit 204 to a first fixed contact 213a of a change-over switch 213 which will be hereinafter further described. The timebase compressing circuit 204 is adapted to compress a timebase of the visual image information of each horizontal scanning line of the video signal supplied thereto by one-half.

A logic or interpolation filter which is similar to that described above with reference to FIG. 10 is shown connected to a series circuit of the first and second delay circuits 202 and 203 so as to discriminate between the amplitudes of a pixel signal at the input terminal of the first delay circuit 202, a pixel signal developed at a junction between the first and second delay circuits 202 and 203 and a pixel signal at the output terminal of the second delay circuit 203. In general, this interpolation filter provides an interpolation signal having an intermediate amplitude, that is, the second largest input pixel signal or the second smallest input pixel signal.

More specifically, the amplitudes of the signals at the input and output terminals of the first delay circuit 202 are discriminated by a logical operating circuit 205, and the amplitudes of the signals at the input and output terminals of the second delay circuit 203 are discriminated by a logical operating circuit 206. The amplitudes of the signal at the input terminal of the first delay circuit 202 and of the signal at the output terminal of the second delay circuit 203 are discriminated by a logical operating circuit 207. Signals developed at minimum value output terminals of the logical operating circuits 205 and 207 are supplied to a logical operating circuit 208 which discriminates between the amplitude of the minimum value output from the logical operating circuit 205 and the amplitude of the minimum value output from the logical operating circuit 207. Further, signals developed at minimum value output terminals of the logical operating circuits 206 and 207 are supplied to a logical operating circuit 209 which discriminates between the amplitudes of the minimum value output from the logical operating circuit 206 and the minimum value output from the logical operating circuit 207. Signals developed at maximum value output terminals of the logical operating circuits 208 and 209 are supplied to a logical operating circuit 210 which discriminates between the maximum value output from the logical operating circuit 208 and the maximum value output of the logical operating circuit 209. The signal developed at the maximum value output terminal of the logical operating circuit 210 is supplied through a timebase compressing circuit 211 and a third delay circuit 212 to a second fixed contact 213$b$ of the change-over switch 213 as an output signal of the interpolation filter. The timebase compressing circuit 211 is adapted to compress a time base of visual image information of each horizontal scanning line of a video signal supplied thereto by one-half, similarly to the aforementioned timebase compressing circuit 204. The third delay circuit 212 is adapted to delay the video signal by a delay time of $\frac{1}{2}$ horizontal scanning period, that is, (0.5 H).

The change-over switch 213 is suitably responsive to the supply of the video signal to alternately connect a movable contact 213$m$ thereof to the first and second fixed contacts 213$a$ and 213$b$ at every $\frac{1}{2}$ horizontal scanning period. A video signal developed at the movable contact 213$m$ is supplied to an output terminal 214.

In the circuit arrangement described above with reference to FIG. 14, the video signal applied to the input terminal 201 is doubled in line-frequency or horizontal scanning lines and is delivered from the output terminal 214.

Figure 1B:
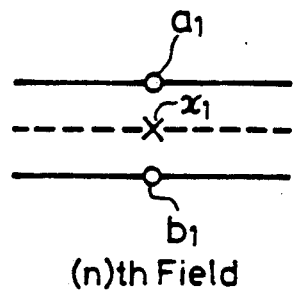
Figure 1C:
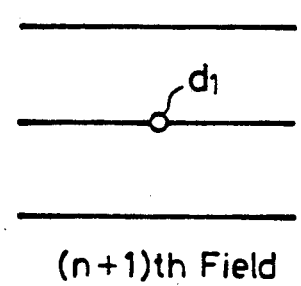
Figure 15:
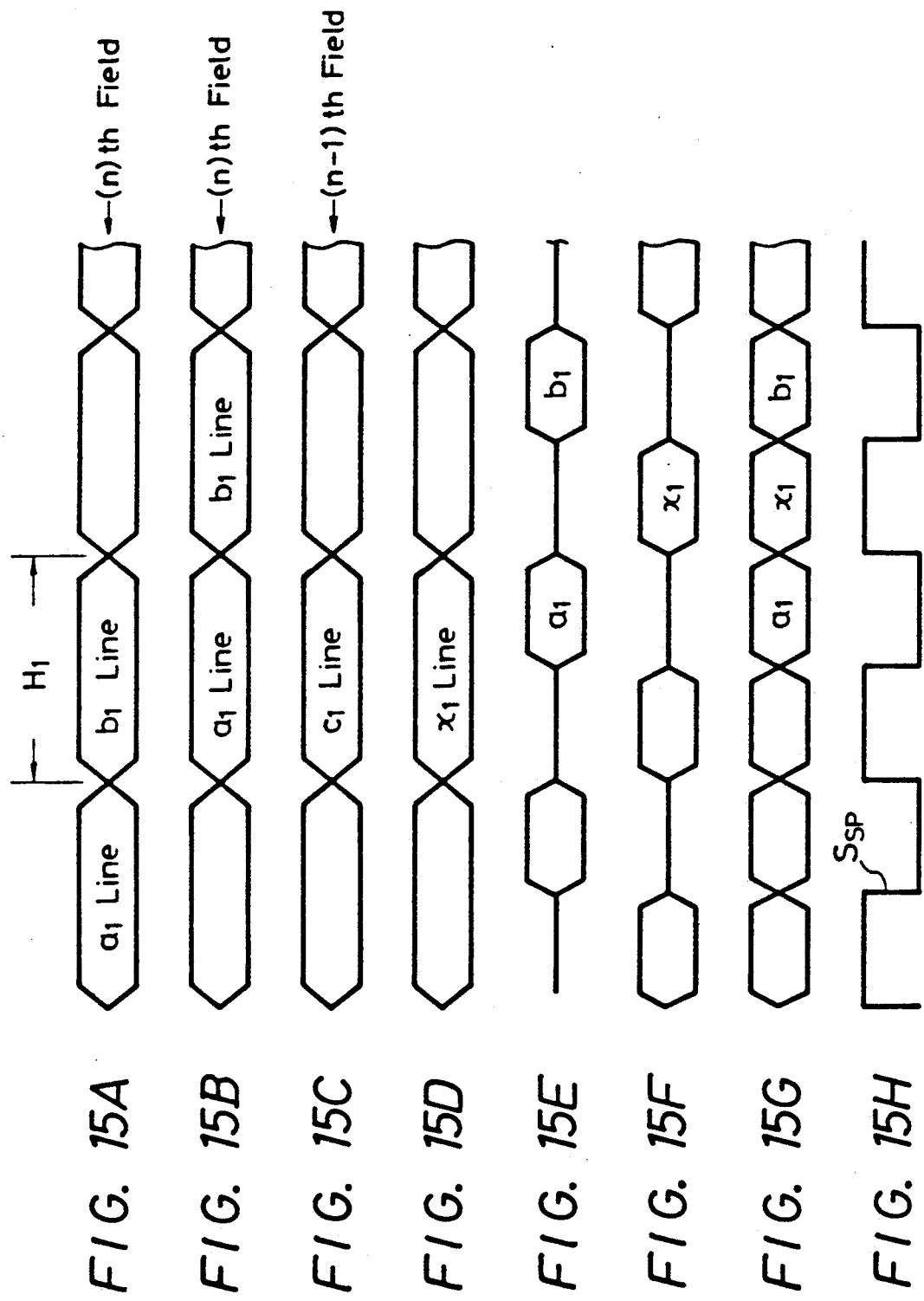
FIGS. 15A to 15H are timing charts to which reference will be made in explaining operation of the interpolation signal producing circuit shown in FIG. 14.

This will be described more fully with reference to FIGS. 1A-1C and FIGS. 15A-15H. In this connection, it is to be noted that the horizontal lines of the (n)th field containing pixels (or picture elements) at points $a_1$ and $b_1$ in FIG. 1B are identified as the "$a_1$ line" and "$b_1$ line", respectively, in FIGS. 15A and 15B, whereas, the horizontal line in the (n−1)th field containing a pixel at a point $c_1$ (FIG. 1A) and which is positioned between the $a_1$ line and $b_1$ line is identified as the "$c_1$ line" (FIG. 15C). During a predetermined horizontal scanning period $H_1$ in which a video signal of the $b_1$ line in the (n)th field is supplied to the input terminal 201, for example, as shown in FIG. 15A, a video signal of the $a_1$ line in the same or (n)th field is developed at the output terminal of the first delay circuit 202, as shown in FIG. 15B, and a video signal of the $c_1$ line in the preceding or (n−1)th field is developed at the output terminal of the second delay circuit 203, as shown in FIG. 15C. The logical operating circuits 205, 206, 207, 208, 209 and 210 discriminate signals of three lines, that is, a signal of the $a_1$ line, a signal of the $b_1$ line and a signal of the $c_1$ line. The amplitudes of these signals are discriminated at-every pixel of the three lines and the logical operating circuit 210 produces an output signal having an amplitude intermediate the discriminated amplitudes at every pixel. The output signal of intermediate amplitude is provided from the logical operating circuit 210 as an interpolated signal for the $x_1$ line (FIG. 15D), that is, the interpolated line in the (n)th field containing the pixel $x_1$ between the pixels $a_1$ and $b_1$ (FIG. 1B).

In the second half period of the horizontal scanning period $H_1$ an $a_1$ line signal with its timebase compressed by one-half (FIG. 15E) is supplied from the output of delay circuit 202 and through timebase compressing circuit 204 to the first fixed contact 213$a$ of the change-over switch 213. A signal of the $x_1$ line, which is an interpolation line, is supplied from circuit 210 to the second fixed contact 213$b$ with its timebase compressed in circuit 211 and with a delay time of 0.5 H imposed in circuit 212 (FIG. 15F). The change-over switch 213 alternately connects its movable contact 213$m$ to its first fixed contact 213$a$ and its second fixed contact 213$b$ at every 0.5 H in response to a switching pulse signal $S_{sp}$ (FIG. 15H) so that the output signal developed at the output terminal 214 is a video signal in which one-half of each horizontal scanning period is comprised of the signal of the $a_1$ line or the $b_1$ line supplied to the input terminal 201 and the signal of the $x_1$ line, which is an interpolation line, is inserted between the signal of $a_1$ line and the signal of the $b_1$ line, as shown in FIG. 15G. As a result, the video signal developed at the output terminal 214 is a non-interlace scanning signal in which the number of horizontal scanning lines per field is doubled.

The interpolation signal formed by the interpolation signal producing circuit of FIG. 14 will be further described with reference to the examples of FIGS. 2 and 3.

Figure 2:
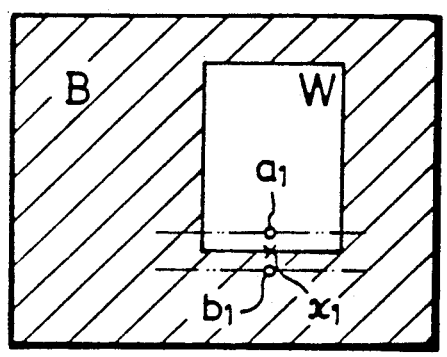
FIG. 2 is a schematic diagram of a reproduced still picture, and to which reference is made in explaining the effects of various types of interpolation in double-scanning.
Figure 3:
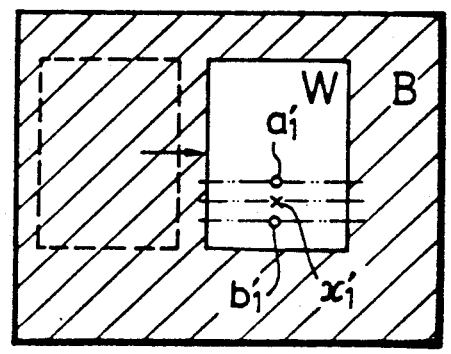
FIG. 3 is a schematic diagram of a reproduced real moving picture, and to which reference is made in explaining the effects of various types of interpolation in double-scanning.
Figure 4:
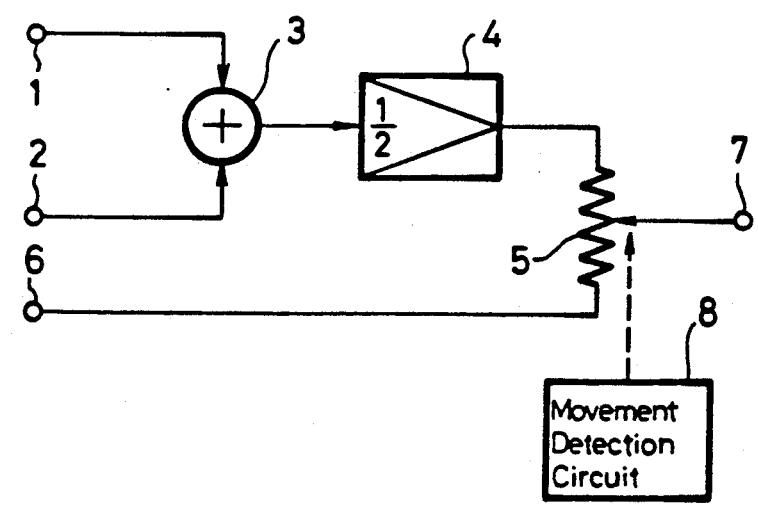
FIG. 4 is a schematic block diagram showing an example of a prior-art interpolation signal producing circuit.
Figure 5A:
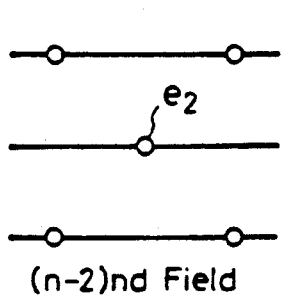
FIGS. 5A to 5C are schematic diagrams to which reference will be made in explaining various types of interpolation signals for use in sub-sampling.
Figure 5B:
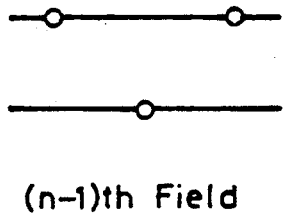
Figure 5C:
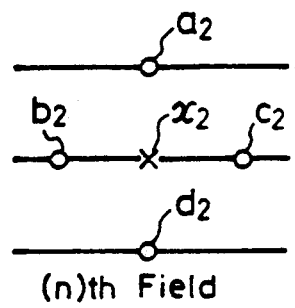

In the case of the still picture shown in FIG. 2, a predetermined pixel $x_1$ on the interpolation line formed at the boundary between a white image W (level "1") and a black background B (level "0") is presented as $x_1 = 1$ to form a white pixel by selecting the signal having an intermediate amplitude, because $a_1 = 1$, $b_1 = 0$ and $c_1 = 1$. Thus, a good interpolation signal can be produced. In the case of the real moving picture shown in the example of FIG. 3, a predetermined pixel $x_1'$ contained in the interpolation line formed in the portion which is included in the white image W in (n)th field and which is included in the black background B in the preceding or (n−1)th field is presented as $x_1' = 1$ by selecting the signal having an intermediate amplitude because $a_1' = 1$, $b_1' = 1$ and $c_1' = 0$. Accordingly, the pixel $x_1'$ becomes a white pixel and thus, a good interpolation signal can also be produced.

It will be appreciated from the above that the interpolation signal producing circuit according to the first embodiment shown on FIG. 14, is effective, whether the input video signal represents a still picture or a real moving picture, to provide an optimum interpolation signal by means of a simplified circuit arrangement which requires no movement detecting circuit, and that an excellent reproduced picture according to the non-interlace scanning system can be obtained from the video signal obtained at output terminal 214.

An interpolation signal producing circuit according to a second embodiment of the present invention will now be described with reference to FIGS. 16 and 17A–17G. The interpolation signal producing circuit of FIG. 16, similarly to that described with reference to FIG. 14, produces an interpolation signal for non-interlace scanning by doubling the number of horizontal scanning lines of a video signal.

Figure 16:
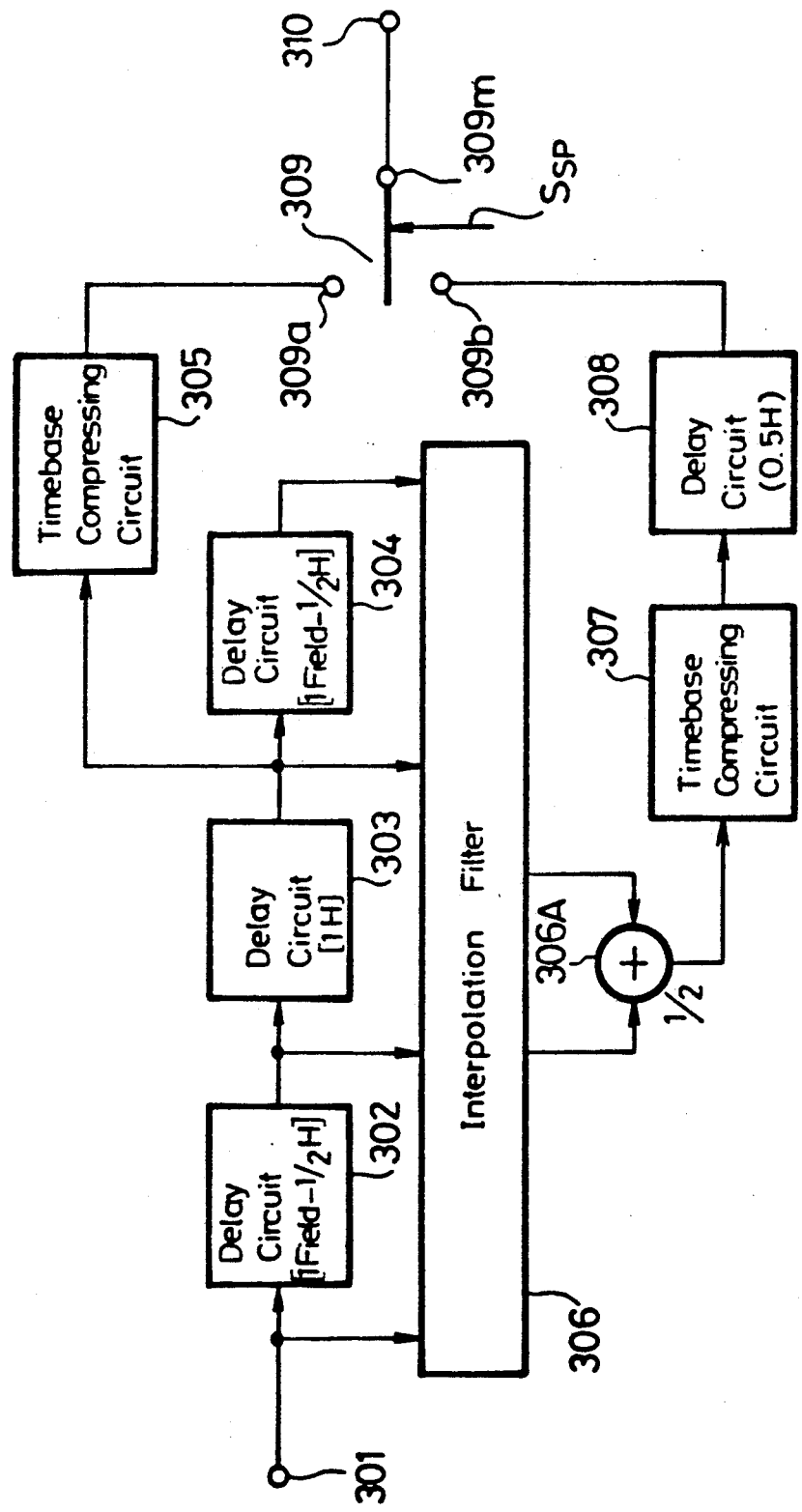
FIG. 16 is a block diagram showing an interpolation signal producing circuit according to a second embodiment of the present invention for doubling horizontal scanning lines.

More particularly, in FIG. 16, a video signal to be doubled in line-frequency is supplied through an input terminal 301 to a series circuit of first, second and third delay circuits 302, 303 and 304. The first and third delay circuits 302 and 304 are adapted to delay the video signal by the delay time of [1 field $-\frac{1}{2}$ horizontal scanning period], whereas the second delay circuit 303 is adapted to delay the video signal by the delay time of one horizontal scanning period (1 H).

An output video signal from the second delay circuit 303 is supplied through a timebase compressing circuit 305 to a first fixed contact 309a of a change-over switch 309 which will be hereinafter further described. The timebase compressing circuit 305 is adapted to compress the timebase of the visual image information of each horizontal scanning line of the video signal by one-half.

The series circuit formed of the first, second and third delay circuits 302, 303 and 304 is connected with a 4-input interpolation filter 306. The 4-input interpolation filter 306 is adapted to discriminate the amplitudes of four signals developed at four points, that is, at an input terminal of the first delay circuit 302, a junction between the first and second delay circuits 302 and 303, a junction between the second and third delay circuit 304. Although the details of the interpolation filter 306 are not shown in FIG. 16, the amplitudes of the four above-mentioned signals may be discriminated by a combination of logical operating circuits generally as shown in FIG. 12.

In the interpolation signal producing circuit of FIG. 16, a signal having the second largest amplitude and a signal having the second smallest amplitude are derived from output terminals of the interpolation filter 306, which output terminals may correspond to the terminals 52 and 53 on FIG. 12, and these signals are averaged by an averaging circuit 306A to provide an interpolation signal as the output from circuit 306A. The resultant interpolation signal is supplied from averaging circuit 306A through a timebase compressing circuit 307 and fourth delay circuit 308 to a second fixed contact 309b of the change-over switch 309. The timebase compressing circuit 307 is adapted to compress the timebase of visual image information of each scanning line of a video signal supplied thereto by one-half similarly to the timebase compressing circuit 305, and the fourth delay circuit 308 is adapted to delay a video signal by a delay time of $\frac{1}{2}$ horizontal scanning period (0.5 H). The change-over switch 309 alternately connects its movable contact 309m to the first and second fixed contact 309a or 309b at every one-half horizontal scanning period of the input video signal. The output video signal obtained at the movable contact 309m is doubled in line frequency and is supplied to an output terminal 310.

Figure 17:
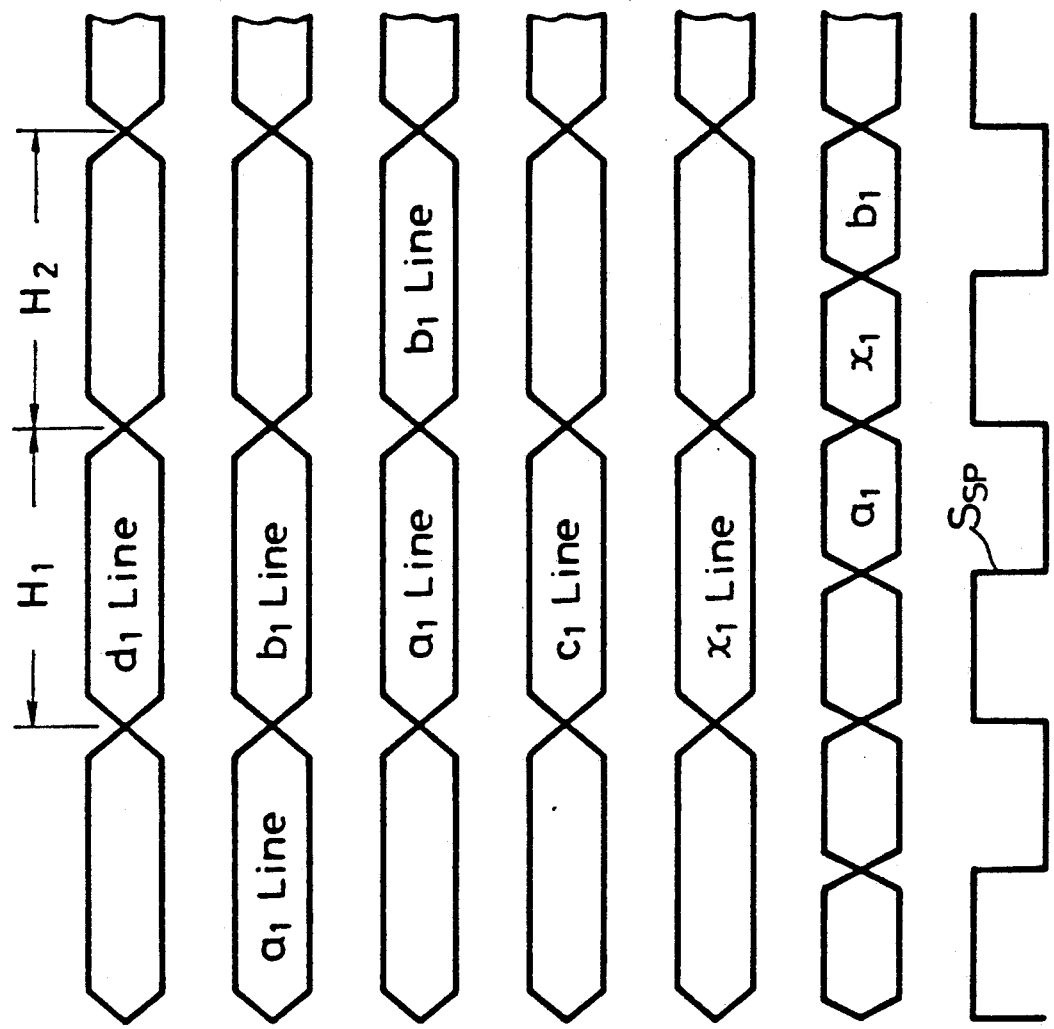
FIGS. 17A to 17G are timing charts to which reference will be made in explaining operation of the interpolation signal producing circuit shown in FIG. 16.

The operation of the circuit arrangement of FIG. 16 will be described more fully with reference to FIGS. 1A–1C and FIGS. 17A–17G. In this connection, it is again noted that the horizontal lines of the (n)th field containing pixels at a point $a_1$ and a point $b_1$ in FIG. 1B are respectively identified as the "$a_1$ line" and "$b_1$ line" in FIG. 17B; whereas, the horizontal line in the (n−1)th field containing a pixel at a point $c_1$ and which is located between the $a_1$ line and $b_1$ line is identified as the $c_1$ line (FIG. 17D). Further, a horizontal line containing a pixel at a point $d_1$ (FIG. 1C) located at the same position as the $c_1$ line but in the (n+1)th field, that is, the field succeeding the field containing the $a_1$ and b lines, is identified as the $d_1$ line. During a predetermined scanning period $H_1$ in which a video signal, for example, of the $d_1$ line (FIG. 17A) of the (n+1)th field is supplied to the input terminal 301, the first delay circuit 302 provides, at an output terminal thereof, a video signal of the $b_1$ line in the (n)th field (FIG. 17B), the second delay circuit 303 provides, at its output terminal, a video signal of the $a_1$ line in (n)th field (FIG. 17C) and the third delay circuit 304 provides at its output terminal a video signal of the $c_1$ line in the (n−1)th field, that is, the field before that containing the $a_1$ line, as shown in FIG. 17D. Accordingly, the amplitudes of the signals of four lines, that is, the signal of the $a_1$ line, the signal of the $b_1$ line, the signal of the $c_1$ line and the signal of the $d_1$ line, are logically-operated upon, at every pixel, by the interpolation filter 306, and the interpolation filter 306 and the averaging circuit 306A combine to provide a signal having an amplitude intermediate the amplitudes of the four inputs to the filter 306. This output signal of the interpolation filter 306 and averaging circuit 306A is provided as an interpolation signal in the $x_1$ line (FIG. 17E).

Accordingly, in the second half of the horizontal scanning period $H_1$, the signal of the a line with its time base-compressed by one-half in the circuit 305 is supplied to the first fixed contact 309a of the change-over switch 309, whereas the signal of the $x_1$ line, which is the interpolation line, with its time base compressed by one-half in the circuit 307 is supplied to the second fixed contact 309b of the switch 309 with a delay time of 0.5 H in the circuit 308. When the movable contact 309m of the change-over switch 309 is changed in position at every 0.5 H in response to a switching pulse signal $S_{sp}$ shown in FIG. 17G, the signal developed at the output terminal 310 is a video signal which, in one-half of each horizontal scanning period, is constituted by the $a_1$ or $b_1$ line signal, and which, in the other half of each horizontal period, is constituted by the signal of the $x_1$ line, which is the interpolation line and is inserted between the signal of the $a_1$ line and the signal of the $b_1$ line, as shown in FIG. 17F. Therefore, the video signal obtained at terminal 310 is a non-interlace scanning signal in which the number of horizontal scanning lines of each field is doubled.

Thus, the embodiment of the invention described above with reference to FIG. 16 is also effective whether the input video signal represents a still picture or a real moving picture, to provide an excellent interpolation signal by means of the logical interpolation, and a reproduced picture of high definition according to the non-interlace scanning system can be obtained from the output video signal. In the embodiment of FIG. 16, the signal states at four points, that is, two points within the field to be interpolated and two points within the immediately preceding and succeeding fields, respectively, are discriminated or sorted as to their amplitudes to produce an interpolation signal, as compared with the first described embodiment in which the interpolation signal is produced on the basis of the signal states of only three points. Therefore, it may be anticipated that the interpolation signal can be produced with higher accuracy in the embodiment of FIG. 16 then in the embodiment of FIG. 14.

While the intermediate amplitude cannot be directly selected by the logical operation in the filter 306 alone when the signal states of four points are discriminated in the embodiment of FIG. 16, the second largest signal which is close to the middle amplitude can be employed as the interpolation signal, in which case, the averaging circuit 306A can be omitted. It is also possible that the second smallest signal may be employed as the interpolation signal.

An interpolation signal producing circuit according to a third embodiment of the present invention will now be described with reference to FIGS. 18 and 19A–19G, and will be seen to be operative to carry out a so-called sub-sampling for doubling the number of pixels within each horizontal scanning line of a video signal.

Figure 18:
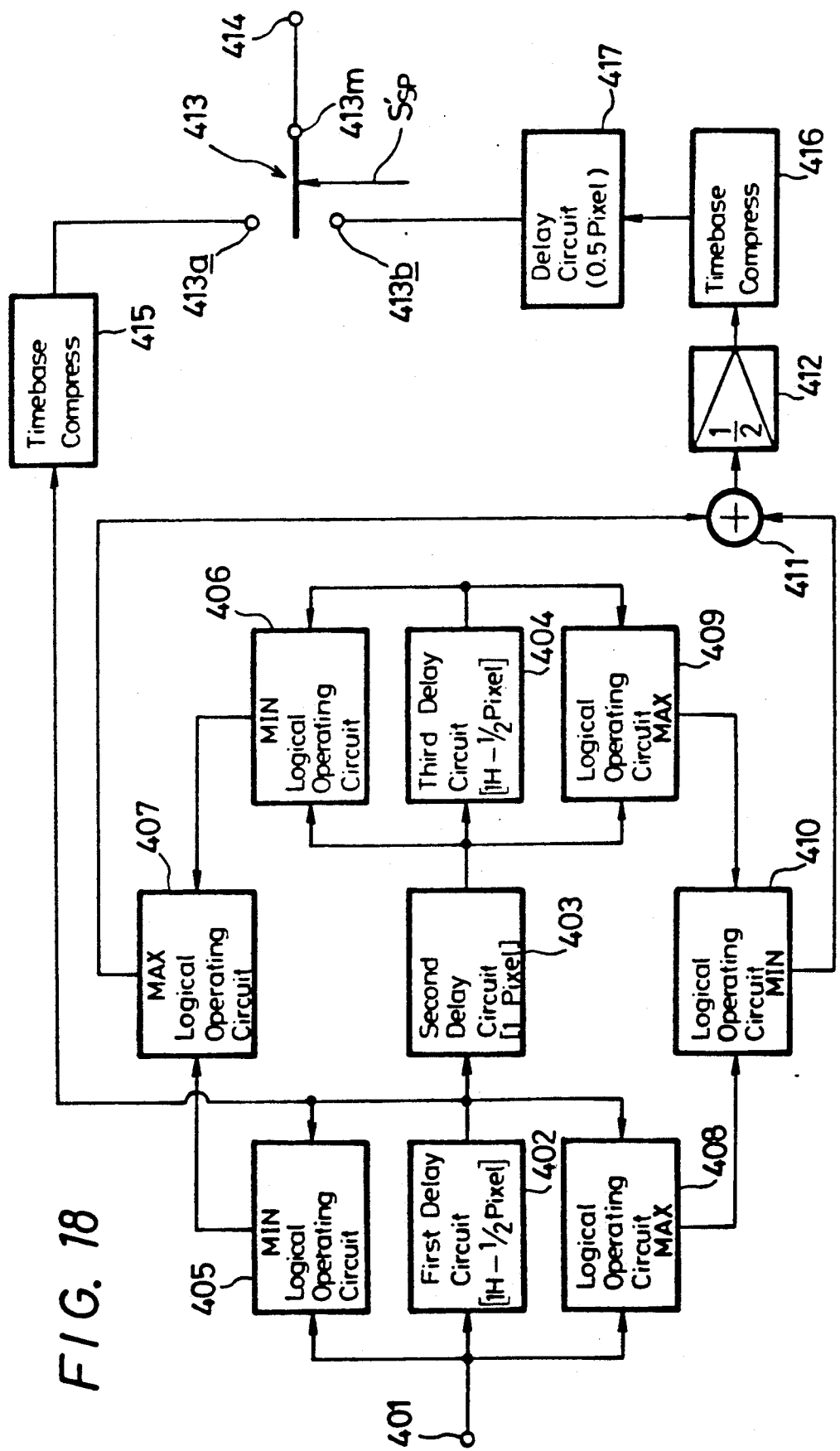
FIG. 18 is a block diagram showing an interpolation signal producing circuit according to a third embodiment of the present invention for sub-sampling.

In the circuit of FIG. 18, a video signal to be sub-sampled for doubling the number of pixels in each horizontal scanning line is supplied through an input terminal 401 to a series circuit formed of first, second and third delay circuits 402, 403 and 404. The first delay circuit 402 and the third delay circuit 404 are each adapted to delay a video signal by a delay time of [1 horizontal scanning period − ½ pixel scanning period], whereas the second delay circuit 403 is adapted to delay a video signal by a scanning period of one pixel. The output video signal from the first delay circuit 402 is supplied through a timebase compressing circuit 415 to a first fixed contact 413a of a change-over switch 413 which will be hereinafter further described.

A 4-input interpolation filter is connected to the series circuit of the first, second and third delay circuits 402, 403 and 404 to discriminate the second largest signal and the second smallest signal.

More specifically, the amplitudes of the signals at the input and output terminals of the first delay circuit 402 are logically operated on by a logical operating circuit 405, and the amplitudes of the signals at the input and output terminals of the third delay circuit 404 are logically operated on by a logical operating circuit 406. Signals developed at minimum value output terminals of the logical operating circuits 405 and 406 are supplied to another logical operating circuit 407 which outputs the maximum thereof at a maximum value output terminal of the logical operating circuit 407 connected to one input terminal of an adder 411.

The amplitudes of signals at the input and output terminals of the first delay circuit 402 are also logically operated on by a logical operating circuit 408, and the amplitudes of the signals at the input and output terminals of the third delay circuit 404 are also logically operated on by a logical operating circuit 409. Signals developed at maximum value output terminals of the logical operating circuits 408 and 409, respectively, are supplied to a logical operating circuit 410. The logical operating circuit 410 determines the lower one of the maximum value output of the logical operating circuit 408 and the maximum value output of the logical operating circuit 409 and provides a corresponding value or amplitude at a minimum value output terminal of the logical operating circuit 410 which is supplied to another input terminal of the adder 411.

The video signals applied to the first and second input terminals of the adder 411 are added therein, and the resulting sum signal is supplied through a ½ attenuator 412 so as to be averaged prior being applied to a timebase compressing circuit 416. The resulting timebase compressed signal is supplied through a delay circuit 417 having a delay time of ½ pixel to a second fixed contact 413b of the change-over switch 413 which alternately connects its movable contact 413m to the first and second fixed contacts 413a and 413b at every scanning period of ½ pixel. The resulting video signal developed at the movable contact 413m and which is comprised of alternating real pixel signals and interpolation signals is supplied to an output terminal 414.

In operation of the above described circuit arrangement shown on FIG. 18, the video signal applied to the input terminal 401 has the effective number of pixels within each horizontal scanning line doubled prior to being fed to the output terminal 414. This operation will be described more fully with reference to FIGS. 5A–5C and FIGS. 19A–19G.

Figure 19:
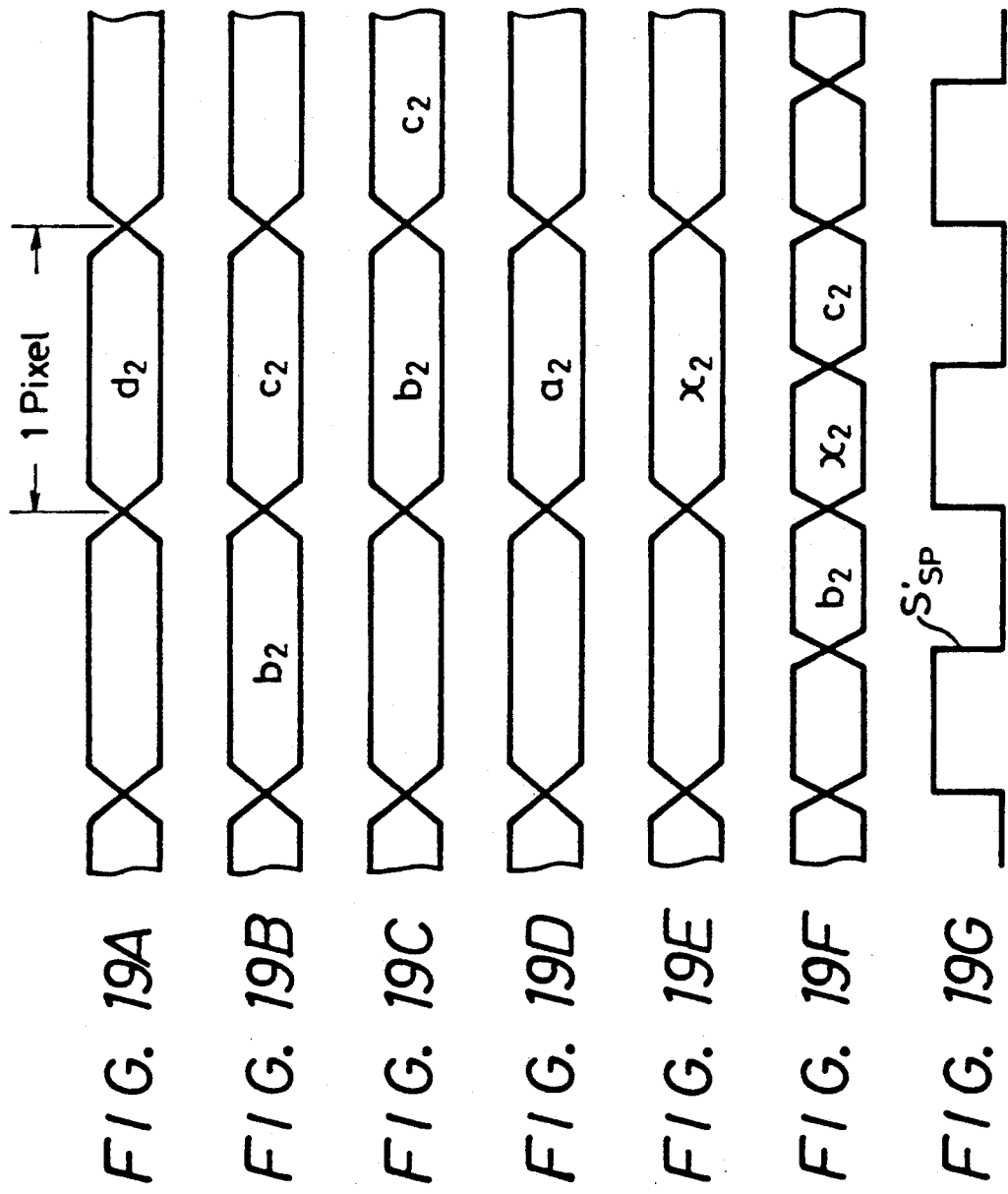
FIGS. 19A to 19G are timing charts to which reference will be made in explaining operation of the interpolation signal producing circuit shown in FIG. 18.

An interpolation pixel point $x_2$ is formed between points $b_2$ and $c_2$ which indicate adjacent pixels on the same horizontal line (FIG. 5C), and a point $a_2$ and a point $d_2$ which indicate adjacent pixels on horizontal lines above and below the line of interpolation point $x_2$. In the period in which a signal of the pixel at the point $d_2$ (FIG. 19A) is supplied to the input terminal 401, the first delay circuit 402 provides, at an output terminal thereof, a signal of the pixel at the point $c_2$ in the horizontal line which precedes or is above the line containing the point $d_2$, as shown in FIG. 19B. At the same time, the second delay circuit 403 provides, at an output terminal thereof, a signal of the pixel at the point $b_2$ which precedes the point $c_2$ by one pixel as shown in FIG. 19C; and the third delay circuit 404 provides, at an output terminal thereof, a signal of the pixel at the point $a_2$ in the horizontal line which precedes or is next above the line containing the points $b_2$ and $c_2$, as shown in FIG. 19D. Therefore, signals of the pixels at four points, that is, immediately above and below and to the right and left, respectively, of the desired interpolation pixel $x_2$ are obtained. Consequently, the logical operating circuit 407 provides, as its maximum value output, the pixel signal having the second smallest amplitude from among the pixel signals at the points $a_2$, $b_2$, $c_2$ and $d_2$. Simultaneously, the logical operating circuit 410 provides, as its minimum value output, the pixel signal having the second largest amplitude from among the pixel signals at the points $a_2$, $b_2$, $c_2$ and $d_2$. Then, the pixel signal having the second, or next to the smallest amplitude and pixel signal having the second, or next to the largest amplitude are averaged, that is, added by the adder 411 and level-adjusted by the ½ attenuator 412, prior to feeding of the average value through the timebase compressing circuit 415 and the delay circuit 417 to the fixed contact 413b of the change-over switch 413 as the signal of the interpolation pixel at the point $x_2$ (FIG. 19E).

Thus, when the change-over switch 413 alternately connects its movable contact 413m to the first and second fixed contacts 413a and 413b at every scanning period of ½ pixel in response to a pulse signal S'$_{sp}$ (FIG. 19G), the pitch of each pixel is one-half that in the signal applied to the input terminal 401 by reason of the time-base compressing circuit 415, and a signal of an interpolation pixel $x_2$ is similarly compressed and inserted between the compressed signals of pixels existing in the input video signal. In the video signal output from terminal 414, the number of pixels in each horizontal scanning line is doubled.

The advantageous character of the interpolation signal produced by the interpolation signal producing circuit of FIG. 18 will now be described with reference to FIGS. 6 and 7.

Figure 6:
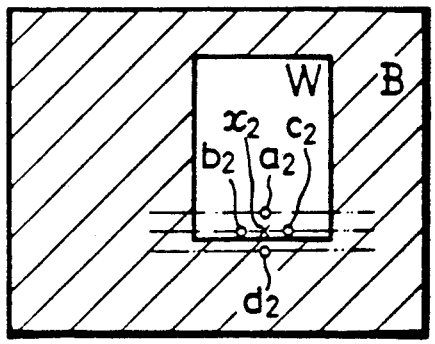
FIG. 6 is a schematic diagram of a reproduced still picture, and to which reference will be made in explaining the effects of various types of interpolation in sub-sampling.

In the case of the still picture shown in FIG. 6, when the interpolation pixel $x_2$ is to be formed on the horizontal line within a white portion of the boundary between the white image W (level "1") and the black background B (level "0"), the next to the largest amplitude and the next to the smallest amplitude each become "1" because $a_2=1$, $b_2=1$, $c_2=1$ and $d_2=0$. When the next to the largest amplitude=1 and the next to the smallest amplitude=1 are averaged by the adder 411 and the ½ attenuator 412, the result is a white pixel of $x_2=1$. Thus, an excellent interpolation signal is generated.

Figure 7:
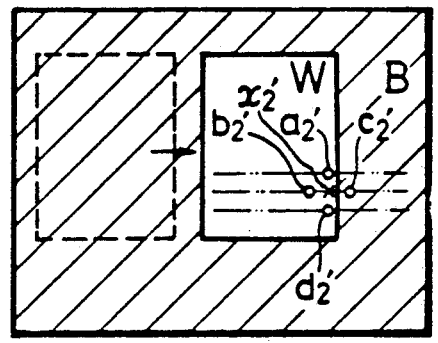
FIG. 7 is a schematic diagram of a reproduced real moving picture, and to which reference will be made in explaining the effects of various types of interpolation in sub-sampling.
Figure 8:
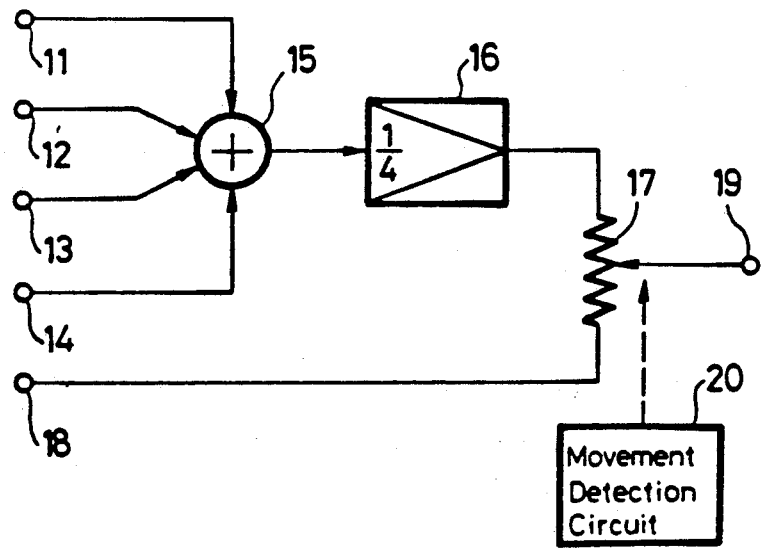
FIG. 8 is a schematic block diagram showing another example of a prior-art interpolation signal producing circuit for use in connection with sub-sampling.

In the case of the real moving picture shown in FIG. 7, when the interpolation pixel $x_2'$ is to be formed in a horizontal line at a portion thereof which is included in the white image W in a certain field and which becomes part of the black background B in the immediately-preceding field, $a_2'=1$, $b_2'=1$, $c_2'=0$ and $d_2'=1$ are established, whereby the next to the largest amplitude and the next to the smallest amplitude are both presented as "1". When these values are averaged by adder 411 and the ½ attenuator 412, the result is an interpolated white pixel which is presented as $x_2'=1$. Therefore, a satisfactory interpolation signal is produced.

With the circuit arrangement of FIG. 18, whether the input video signal represents a still picture or a real moving picture, it is possible to produce an optimum interpolation signal by a simplified circuit arrangement which need not include a movement detection circuit. Accordingly, a high resolution reproduced picture, in which each horizontal scanning line has an increased number of pixels, can be formed from the output video signal.

Further, while the interpolation signal $x_2$ or $x_2'$ for the sub-sampling is formed only from signals of adjacent pixels within the same field, as described above, it is also possible to provide a circuit for discriminating the amplitudes of adjacent pixels in adjacent fields in producing interpolation signals.

An interpolation signal producing circuit according to a fourth embodiment of the present invention will now be described with reference to FIGS. 20 and 21A-21C. The interpolation signal producing circuit of FIG. 20 is adapted to produce interpolation signals for compensating for drop-outs occurring in a video signal reproduced by a video tape reproducing apparatus or the like.

In the circuit of FIG. 20 a reproduced video signal is supplied through an input terminal 501 to a first delay circuit 502, and an output signal of the first delay circuit 502 is supplied to a second delay circuit 503. The first and second delay circuits 502 and 503 are each adapted to delay the video signal by a delay time of one horizontal scanning period (1 H). The output video signal from the first delay circuit 502 is also supplied to a first fixed contact 505a of a change-over switch 505 which will be hereinafter further described.

A three input interpolation filter 504 is connected to the series circuit comprised of the first and second delay circuits 502 and 503. The 3-input interpolation filter 504 is adapted to logically operate on the amplitudes of signals developed at three points, that is, at an input terminal of the first delay circuit 502, at a junction between the first and second delay circuits 502 and 503 and at an output terminal of the second delay circuit 503. The interpolation filter 504 provides at an output terminal thereof a signal having an intermediate amplitude (next to the largest or next to the smallest amplitude). An output signal from the interpolation filter 504 is supplied to another fixed contact 505b of the change-over switch 505. The change-over switch 505 is controlled to engage its movable contact 505m with one or the other of the fixed contact 505a and 505b by a drop-out detecting circuit 506 which will be hereinafter explained more fully. A dropout compensated video signal developed at the movable contact 505m is supplied to an output terminal 507.

The video signal applied to the input terminal 501 is supplied to the drop-out detecting circuit 506. When the drop-out detecting circuit 506 detects that the level of the input video signal is temporarily lowered considerably, for example, due to a drop-out, the movable contact 505m of the change-over switch 505 is engaged with the fixed contact 505b with a delay time of one horizontal scanning period and remains there engaged for so long as the level of the input video signal remains low. When the drop-out detecting circuit 506 does not detect a lowered level of the input video signal, the movable contact 505m is engaged with the fixed contact 505a. By reason of the foregoing operation of the switch 505 under the control of detecting circuit 506, when a drop-out occurs in a video signal applied to the input terminal 501, a drop-out-compensated or interpolated video signal is delivered from the output terminal 507. The foregoing operation will be explained with reference to FIGS. 21A to 21C.

When a video signal of a predetermined horizontal scanning line, hereinafter referred to as the (m)th line, is supplied to the fixed contact 505a of the change-over switch 505 as an output of the first delay circuit 502, as shown in FIG. 21B, the second delay circuit 503 provides, at the output terminal thereof, a video signal of the preceding or (m−1)th line, as shown in FIG. 21A, whereas the first delay circuit 502 receives at the input terminal thereof a video signal of the next succeeding or (m+1)th line 1 as shown in FIG. 21C. When the drop-out detecting circuit 506 does not detect a drop-out in the input video signal, the engagement of the movable contact 505m with the fixed contact 505a is maintained. When a drop-out occurs in a portion of the input video signal, for example, in the (m)th line to lower its level considerably, the drop-out detecting circuit 506 responds to such drop-out to cause the change-over switch 505 to engage its movable contact 505m with the fixed contact 505b at the time the line containing the drop out, that is, the (m)th line appears at the output of the delay circuit 502.

The interpolation filter 504 compares the amplitudes of the signal of the (m)th line, the signal of the (m+1)th line and the signal of the (m−1)th line at every pixel and produces a signal having an intermediate amplitude which is supplied to the fixed contact 505m of the change-over switch 505. As a result, a signal of the (m)th line having the smallest amplitude, for example, due to the occurrence of drop-out, can be prevented from appearing in the portion in which the drop-out occurs, and is replaced by an interpolation signal having an intermediate amplitude substantially equal to that of the corresponding signal in the (m+1)th line or in the (m−1)th line. This interpolation signal which has the next to the highest, or next to the lowest amplitude of the three signals being compared, is delivered from the output terminal 507 instead of the signal of the (m)th line containing the drop-out.

In effecting drop-out compensation by the circuit of FIG. 20, the signal states of three consecutive lines (m−1), (m) and (m+1) are discriminated and the signal of the line most suitable for the interpolation is provided as the interpolation signal so that, as compared with the prior art in which the drop-out signal is always replaced with the signal of the next above or preceding line, the signal is compensated (or interpolated) more reliably and accurately for preventing substantial deterioration of the quality of the picture upon drop-out compensation.

An interpolation signal producing circuit according to a fifth embodiment of the present invention will now be described with reference to FIG. 22 and FIGS. 23A to 23C.

Figure 22:
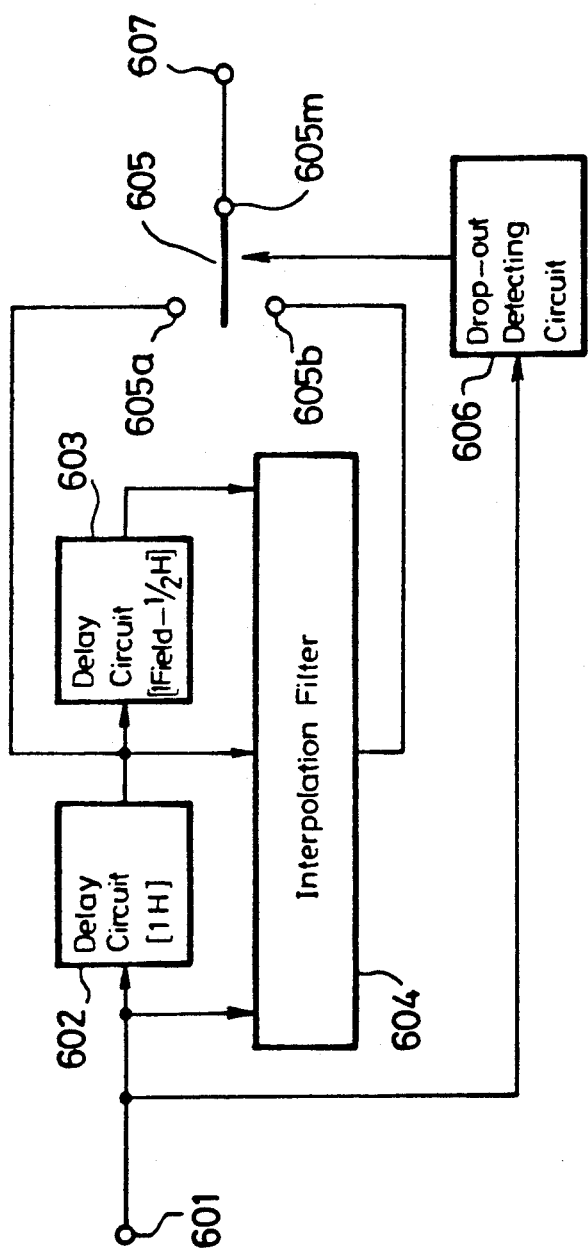
FIG. 22 is a block diagram showing an interpolation signal producing circuit according to a fifth embodiment of the present invention also used for drop-out compensation.

The interpolation signal producing circuit of FIG. 22 is adapted to produce an interpolation signal to compensate for a drop-out occurring in a video signal reproduced by a video tape reproducing apparatus or the like, and is generally similar to the interpolation signal producing circuit described with reference to FIG. 20.

Thus, the circuit of FIG. 22 has an input terminal 601 through which a reproduced video signal is supplied to a first delay circuit 602, and an output signal of the first delay circuit 602 is supplied to a second delay circuit 603. The first delay circuit 602 is adapted to delay a video signal by a delay time of one horizontal scanning period (1 H), and the second delay circuit 603 is adapted to delay a video signal by a delay time of [one field period −½ horizontal scanning period]. The output video signal from the first delay circuit 602 is also supplied to a fixed contact 605a of a change-over switch 605 which will be hereinafter further described.

A three-input interpolation filter 604 is connected to a series circuit of the first and second delay circuits 602 and 603, and is adapted to logically operate on the amplitudes of three signals, that is a signal at an input terminal of the first delay circuit 602, a signal developed at a junction between the first and second delay circuits 602 and 603 and a signal developed at an output terminal of the second delay circuit 603. The interpolation filter 604 provides, at an output terminal thereof, a signal having an intermediate amplitude, that is, the next to the largest or the next to the smallest of the three input signal amplitudes. The output signal of the interpolation filter 604 is supplied to another fixed contact 605b of the change-over switch 605. The change-over switch 605 is controlled so as to engage its movable contact 605m with the fixed contact 605a or 605b by means of a drop-out detecting circuit 606, and a video signal developed at the movable contact 605m is supplied to an output terminal 607.

The video signal applied to the input terminal 601 is also supplied to the drop-out detecting circuit 606. When the drop-out detecting circuit 606 does not detect a drop-out, that is, when the level of the input video signal is not considerably lowered, the change-over switch 605 maintains its movable contact 605m in engagement with the fixed contact 605a. However, when the drop-out detecting circuit 505 detects that a level of the input video signal is temporarily lowered considerably, the change-over switch 605 engages its movable contact 605m with the fixed contact 605b with a delay time of one horizontal scanning period and such engagement continues during the drop-out period.

Thus, when a drop-out occurs in the video signal applied to the input terminal 601, a drop-out-compensated video signal is delivered from the output terminal 607 in a manner similar to that described with reference to FIG. 20. However, in the case of the embodiment of FIG. 22, an interpolation signal is produced by logically operating on the amplitudes of signals of two adjacent horizontal lines in one field and a signal of the next-preceding field so that, even when the signals of adjacent lines are not correlated at all, the drop-out can be compensated satisfactorily.

Figure 23A:
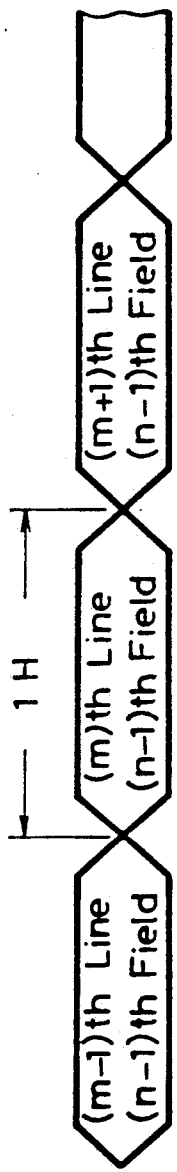
FIG. 23A to 23C are timing charts to which reference will be made in explaining operation of the interpolation signal producing circuit shown in FIG. 22.
Figure 23B:
Figure 23C:

More specifically, and assuming that a video signal of a predetermined or (m)th horizontal scanning line of a predetermined or (n)th field is supplied to the fixed contact 605a of the change-over switch 605 from the output of the first delay circuit 602, as shown in FIG. 23B, then the second delay circuit 603 provides, at the output terminal thereof, a signal of a line near the (m)th line position of the next preceding or (n−1)th field, as shown in FIG. 23A, and the input terminal of the first delay circuit 602 receives a signal of the (m+1)th line of the (n)th field, that is, the line next succeeding the (m)th line, as shown in FIG. 23C. When the drop-out detecting circuit 606 detects that the level of the input video signal is considerably lowered by a drop-out occurring in a portion of the signal of the (m)th line, the change-over switch 605 engages its movable contact 605m with the fixed contact 605b with a delay time of (1 H), that is, at the time when the drop-out signal of (m)th line is coming to the output of the first delay circuit 602. Therefore, the interpolation filter 604 can deliver to the output terminal 607 an output signal which results from logically operating on the signal amplitudes of signals of two adjacent lines in one field and the amplitude of a proximate signal in the next preceding field. Consequently, it is frequently observed that the signal developed at the output terminal 607 when a drop-out occurs may be interpolated as a signal of the next preceding field. This depends on the relative amplitudes of the several signals operated upon by the interpolation filter 604. Thus, even when there is no correlation between signals of adjacent lines within one field, a satisfactorily drop-out-compensated signal is delivered from the output terminal 607.

The present invention is not limited to the above-described embodiments, in that, for example the positions of pixels to be supplied to the interpolation filter are not limited to those specifically described, and it is possible to increase the number of pixels to be logically operated on.

By way of summary, it will be noted that, according to the present invention, a satisfactory interpolation signal can be produced by simplified circuit arrangements in which the amplitudes of signals are logically operated upon. Whether the interpolation signal is for doubling the number of the scanning lines or for sub-sampling or doubling the number of pixels within one scanning line, an excellent interpolation signal can be always obtained without the need to detect motion of a visual image. From this standpoint, the circuit arrangement can be simplified, and resolution of the resulting picture can be increased. In addition, an interpolation signal for compensating for a drop-out can be produced by selecting signals of a plurality of lines for the interpolation so that the proper signal can be interpolated in correspondence to the relative amplitudes or states of the signals.

Although preferred embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for subsampling a video signal so as to double the number of pixels within each horizontal scanning line of a displayed picture, comprising:
   means for receiving a video signal and providing four proximate pixel signals of the same field at respective outputs;
   means for comparing amplitudes of said proximate pixel signals appearing at said outputs and determining an order of magnitudes of said amplitudes;
   means for averaging the next to largest and the next to the smallest of said amplitudes and providing the resulting average signal as an interpolation signal;
   means for timebase-compressing one of said pixel signals and said interpolation signal; and
   means for alternately outputting the timebase-compressed pixel signal and interpolation signal as a sub-sampled video signal to be displayed.

2. An apparatus for sub-sampling a video signal according to claim 1, in which said means for receiving a video signal includes first, second and third delay circuits connected in series, said second delay circuit has a delay time of one pixel period of said video signal, and each of said first and third delay circuits has a delay time equal to one horizontal line period of said video signal less one-half said pixel period so that two of said proximate pixel signals are derived at outputs of said first and second delay circuits, respectively, and correspond to adjacent pixels in one horizontal line, and the other two of the proximate pixel signals are derived at an input to said first delay circuit and at said output of the third delay circuit, respectively, and are situated on horizontal lines above and below said one horizontal line between said adjacent pixels in said one horizontal line; and in which said one pixel signal which is timebase-compressed with said interpolation signal is said pixel signal derived at said output of said first delay circuit.

3. An apparatus for sub-sampling a video signal so as to double the number of pixels within each horizontal scanning line of a displayed picture, comprising:
   means for receiving a video signal and providing first, second, third and fourth proximate pixel signals from the same field, said first and second pixel signals being situated adjacent each other on the same horizontal scanning line and said third and fourth pixel signals being situated on horizontal scanning lines above and below, respectively, said horizontal scanning line of the first and second pixel signals and being located between the first and second pixel signals in the direction along the respective horizontal scanning lines;
   means for comparing amplitudes of said first, second, third and fourth pixel signals and determining an order of magnitudes thereof;
   means for generating an interpolation signal having an amplitude which is the average of the next to the largest and next to the smallest of said amplitudes of the pixel signals;
   means for timebase-compressing said first pixel signal and said interpolation signal; and
   means for alternately outputting the timebase-compressed first pixel signal and interpolation signal as a sub-sampled video signal to be displayed.

* * * * *